United States Patent
Tanaka et al.

(10) Patent No.: US 7,223,980 B2
(45) Date of Patent: May 29, 2007

(54) RADIATION DETECTOR THAT ADJUSTS OFFSET COMPONENT

(75) Inventors: Manabu Tanaka, Tochigi-ken (JP); Takayuki Tomisaki, Tochigi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 396 days.

(21) Appl. No.: 10/611,847

(22) Filed: Jul. 3, 2003

(65) Prior Publication Data

US 2004/0056204 A1    Mar. 25, 2004

(30) Foreign Application Priority Data

Jul. 5, 2002    (JP)    ............................. 2002-197546

(51) Int. Cl.
  *G01T 1/24*    (2006.01)
(52) U.S. Cl. ................................ 250/370.09
(58) Field of Classification Search ........... 230/370.09, 230/370.08
  See application file for complete search history.

(56) References Cited

U.S. PATENT DOCUMENTS 6,696,687 B1 *   2/2004   Tomisaki et al. ...... 250/370.09

2001/0024254 A1 *   9/2001   Kwak et al. ................. 349/122

FOREIGN PATENT DOCUMENTS

| EP | 1067606 | * | 4/0000 |
|----|---------|---|--------|
| JP | 2001-056382 | | 1/2001 |

* cited by examiner

*Primary Examiner*—David Porta
*Assistant Examiner*—Djura Malevic
(74) *Attorney, Agent, or Firm*—Oblon, Spivak, McClelland, Maier & Neustadt, P.C.

(57) ABSTRACT

A radiation detector including a detection member, a first driver, an integration amplifier, and a first adjustment member. The detection member includes a plurality of pixels and is configured to generate a first charge. Further, the first driver is configured to supply the detection member with a first predetermined voltage so that the detection member generates the first charge, and the integration amplifier is configured to amplify the first charge generated from the detection member. In addition, the first adjustment member is provided in between the detection member and the integration amplifier, and is configured to adjust an offset component included in the first charge to be amplified by the integration amplifier.

48 Claims, 21 Drawing Sheets

RADIATION DETECTOR THAT ADJUSTS OFFSET COMPONENT

CROSS-REFERENCE TO A RELATED APPLICATION

This application is based upon and claims the benefit of priority from prior Japanese Patent Application No. P2002-197546, filed on Jul. 5, 2002, the entire contents of which are incorporated herein by reference.

BACKGROUND OF THE INVENTION

1. Field of the Invention

The present invention relates to a radiation detector including at least one switching element. The radiation detector may be used for detecting medical images. The present invention further relates to a medical image apparatus for detecting medical images using the radiation detector.

2. Description of the Related Art

It is known that a radiation detector in a medical image apparatus, such as an X-ray diagnosis apparatus, uses, for example, a thin film transistor (hereinafter referred to as TFT) as a switching element for each pixel of the radiation detector. The radiation detector is usually formed by repeating processes for forming a thin film on one surface of a glass substrate, patterning the thin film by etching, forming another thin film to overlap the etched pattern, and patterning the latter thin film.

FIG. 1 is a block diagram showing a radiation detector according to a prior art of the present invention. The radiation detector has a plurality of pixels 300 arrayed in a matrix. Each pixel 300 comprises a signal-read TFT 301, a photoelectric conversion element 302, and a capacitor 303. The photoelectric conversion element 302 is formed of selenium and can directly convert incoming radiation, such as an X-ray, into a charge. The capacitor 303 stores the charge. The charge stored in the capacitor 303 of each pixel 300 is read out to an integrating circuit 311 through the signal-read TFT 301 and a signal line 305.

As shown in FIG. 1, a gate driver 308 controlled by a timing controller 332 turns on/off signal-read TFTs 301 by charging a predetermined potential on vertical select lines 306. Upon switching the signal-read TFTs 301 between ON and OFF, a charge injection is caused due to an apparent capacitance (a parasitic capacitance or a stray capacitance) (hereinafter referred to as a parasitic capacitance) each of which is generated between a gate of the signal-read TFT 301 and the signal line 305. The charge injected may be determined by the parasitic capacitance and a potential difference between a voltage at the time of ON of the signal-read TFT 301 and a voltage at the time of OFF of the signal-read TFT 301. The charge injected is discharged to the signal line 305 and may be read out to the integrating circuit 311 with the charge stored in the capacitor 303. Accordingly, the charge injected influences a charge to be stored in a capacitor 310. Particularly, in case of a fluoroscopy, an incoming signal to be detected is usually small. To detect such a small signal accurately, a capacitance of the capacitor 310 is usually set small. Therefore, due to the charge injected in the capacitor 310, a dynamic range of an amplifier 307 for reading out detected signals (charges discharged from each pixel 300) is narrowed. Further, in some cases, it may cause saturation in the amplifier 307.

As disclosed, for example, in Japanese Patent Application Publication (Kokai) No. 2001-56382, providing dummy pixels 309, the influence by the charge injection may be reduced to a certain extent. Each dummy pixel 309 comprises a TFT 361 and a capacitor 362. A gate driver 330 controlled by the controller 332 turns on/off the TFT 361 of each dummy pixel 309 by charging a predetermined potential on a control line 363 in a reversed phase manner to the switching of the signal-read TFT 301. The predetermined potential charged on the control line 363 may be the same as the potential difference between ON and OFF of the switching of the signal-read TFT 301. Accordingly, the charge injected may be balanced out by the predetermined potential charge on the control line 363. An output of each integrating circuit 311 is supplied to a multiplexer 320.

Although the above technique may be a great improvement for X-ray detection, a prior art radiation detector is still subject to narrowing of its dynamic range. When, for example, charges are read out from the pixel 300 at a high speed, such as 30 frames per second, a difference appears between a rounding of pulses for driving the signal-read TFT 301 and a rounding of pulses for driving the TFT 361. Further, a fluctuation in amounts of the charge injection appears over the array of pixels. Accordingly, a dynamic range of the amplifier 307 can become small. This may disturb reading out detection signals (charges) obtained in the photoelectric conversion element 302 and stored in the pixel 300 in a preferable manner.

Particularly, when the capacitor 310 has only a small capacitance, the amplifier 307 has a possibility of losing its dynamic range even only due to a fluctuation in offsets resulting from the fluctuation in amounts of the charge injection over the array of pixels.

SUMMARY OF THE INVENTION

According to a first aspect of the present invention, there is provided a radiation detector including a detection member, a first driver, an integration amplifier, and a first adjustment member. The detection member includes a plurality of pixels and is configured to generate a first charge. The first driver is configured to supply the detection member with a first predetermined voltage so that the detection member generates the first charge. The integration amplifier is configured to amplify the first charge generated from the detection member, and the first adjustment member is provided in between the detection member and the integration amplifier. Further, the first adjustment member is configured to adjust an offset component included in the first charge to be amplified by the integration amplifier.

According to a second aspect of the present invention, there is provided a radiodiagnosis apparatus for obtaining a radiograph. The apparatus includes a radiation generator, a radiation detector, a memory, a processor, and a display. The radiation generator is configured to generate a radiation, and the radiation detector is configured to detect the radiation generated by the radiation generator. Further, the radiation detector includes a detection member, a first driver, an integration amplifier, and a first adjustment member. The detection member also includes a plurality of pixels and is configured to generate a first charge. The first driver is configured to supply the detection member with a first predetermined voltage so that the detection member generates the first charge, and the integration amplifier is configured to amplify the first charge generated from the detection member and output the amplified charge as a detection signal. In addition, the first adjustment member is provided in between the detection member and the integration amplifier, and is configured to adjust an offset component included in the first charge to be amplified by the integration amplifier. The memory is configured to store a first of the detection signal obtained without the radiation generated by the radiation generator. Further, the processor is configured to obtain a difference signal between the first detection signal stored in the memory and a second of the detection signal obtained when the radiation generator generates the radiation. The display is configured to display an image based on the difference signal obtained by the processor.

BRIEF DESCRIPTION OF THE DRAWINGS

A more complete appreciation of embodiments of the present invention and many of its attendant advantages will be readily obtained by reference to the following detailed description considered in connection with the accompanying drawings, in which.

DETAILED DESCRIPTION OF THE PREFERRED EMBODIMENTS

Embodiments of the present invention will be described with reference to the accompanying drawings. In the embodiments of the present invention, an X-ray diagnosis apparatus will be taken as an example of radiodiagnosis apparatuses. Embodiments, however, of the present invention are not limited to the X-ray diagnosis apparatus, but are also applied to other types of radiodiagnosis apparatuses. In the following description, when there are a plurality of components which have a similar function or a similar configuration among them, only one of the plurality of components may be described in detail and description of the others may be omitted, giving the same sign as the one described, unless it is necessary to add further explanation.

An offset adjustment according to embodiments of the present invention is performed without an X-ray radiation for imaging and is also performed prior to such imaging so as to obtain preferred images in the imaging.

First Embodiment

Figure 1:
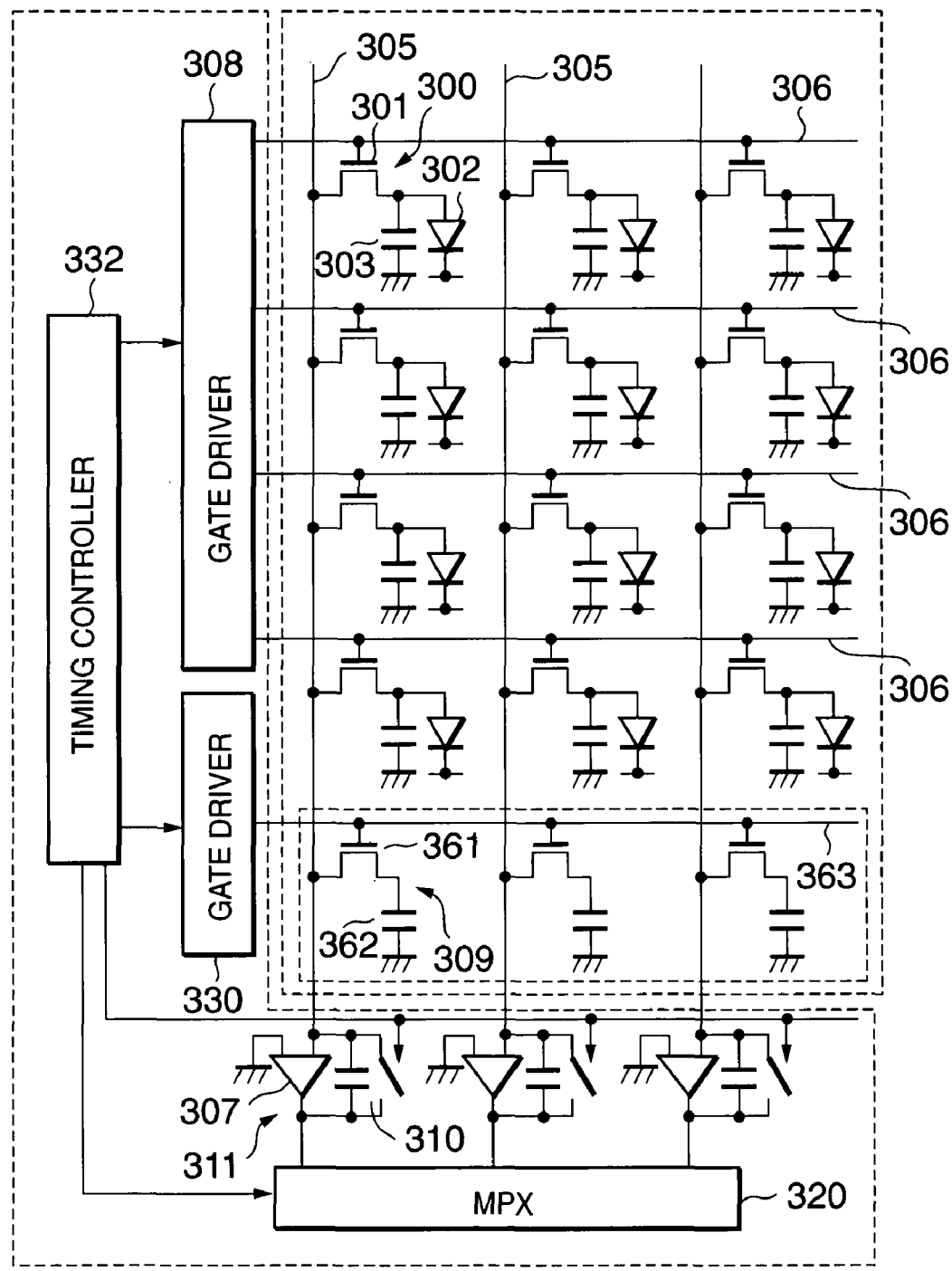
FIG. 1 is a block diagram showing a radiation detector according to a prior art of the present invention.
Figure 2:
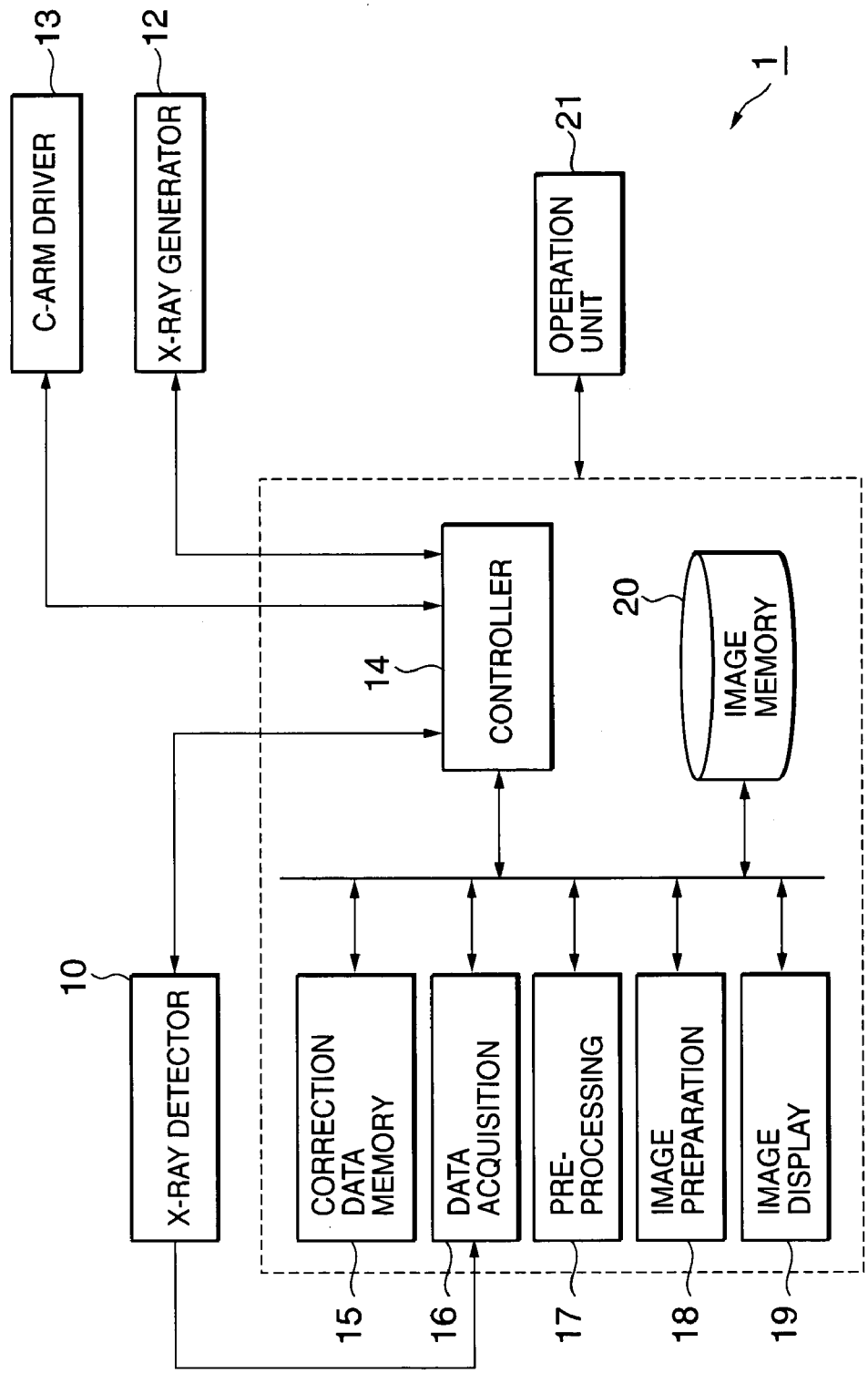
FIG. 2 is a block diagram showing an exemplary configuration of an X-ray diagnosis apparatus according to a first embodiment of the present invention.

FIG. 2 is a block diagram showing an exemplary configuration of an X-ray diagnosis apparatus according to a first embodiment of the present invention. An X-ray diagnosis apparatus 1 includes an X-ray detector 10, an X-ray generator 12, a C-arm driver 13, a controller 14, a correction data memory 15, a data acquisition unit 16, a pre-processing unit 17, an image preparation unit 18, an image display unit 19, an image memory 20, and an operation unit 21.

The X-ray detector 10 is provided at one end of a C-arm (not shown) and detects incoming radiation, such as an X-ray. A configuration or structure of the X-ray detector 10 will be described in detail later.

The X-ray generator 12 is provided at another end of the C-arm and is opposed to the X-ray detector 10. The X-ray generator 12 includes an X-ray tube for radiating an X-ray to a specimen, such as a patient or an object for an examination. The X-ray generator 12 further includes a collimator for collimating the X-ray radiated from the X-ray tube. The X-ray tube includes a vacuum valve and generates the X-ray by accelerating electrons with a high voltage generated in a high voltage generator (not shown) and making the electrons collide with targets. The C-arm driver 13 moves the C-arm in various directions.

The controller 14 controls acquisition of X-ray image data and image processing of the acquired image data. In more detail, for example, the controller 14 controls signal-read timings and a voltage supply to vertical select lines, a control line, and at least one offset adjustment line according to timings described later. The vertical select lines, the control line, and the at least one offset adjustment line will also be described later.

The correction data memory 15 stores data sampled for data correction in a correlated double sampling (hereinafter referred to as a CDS) or the like. Such data are hereinafter referred to as sampling data. To be concrete, as it will be described in detail later, sampling data are sampled twice in one detection-signal-read operation. First, a first sampling data is sampled (immediately) after a release of resetting an integrating circuit which will be described later. The first sampling data is stored in the correction data memory 15. Further, a second sampling data is sampled after reading out a charge stored in a pixel of a detection array of the X-ray detector 10. A difference value between the stored first sampling data and the second sampling data is calculated and stored in the correction data memory 15.

The data acquisition unit 16 acquires digital data which are input from the X-ray detector 10 resulting from the X-ray radiation. The pre-processing unit 17 performs various calibration processing and the like, and the image preparation unit 18 prepares image data based on the acquired digital data, the calibration processing, and the like. Further, the image preparation unit 18 may prepare mask image data, contrast image data, subtraction image data, or the like, if necessary.

In addition, the image display unit 19 displays images based on the image data prepared in the image preparation unit 18, and the image memory 20 stores the image data prepared in the image preparation unit 18. The operation unit 21 is an input device and may include a keyboard, a mouse, and/or various switches.

Figure 3:
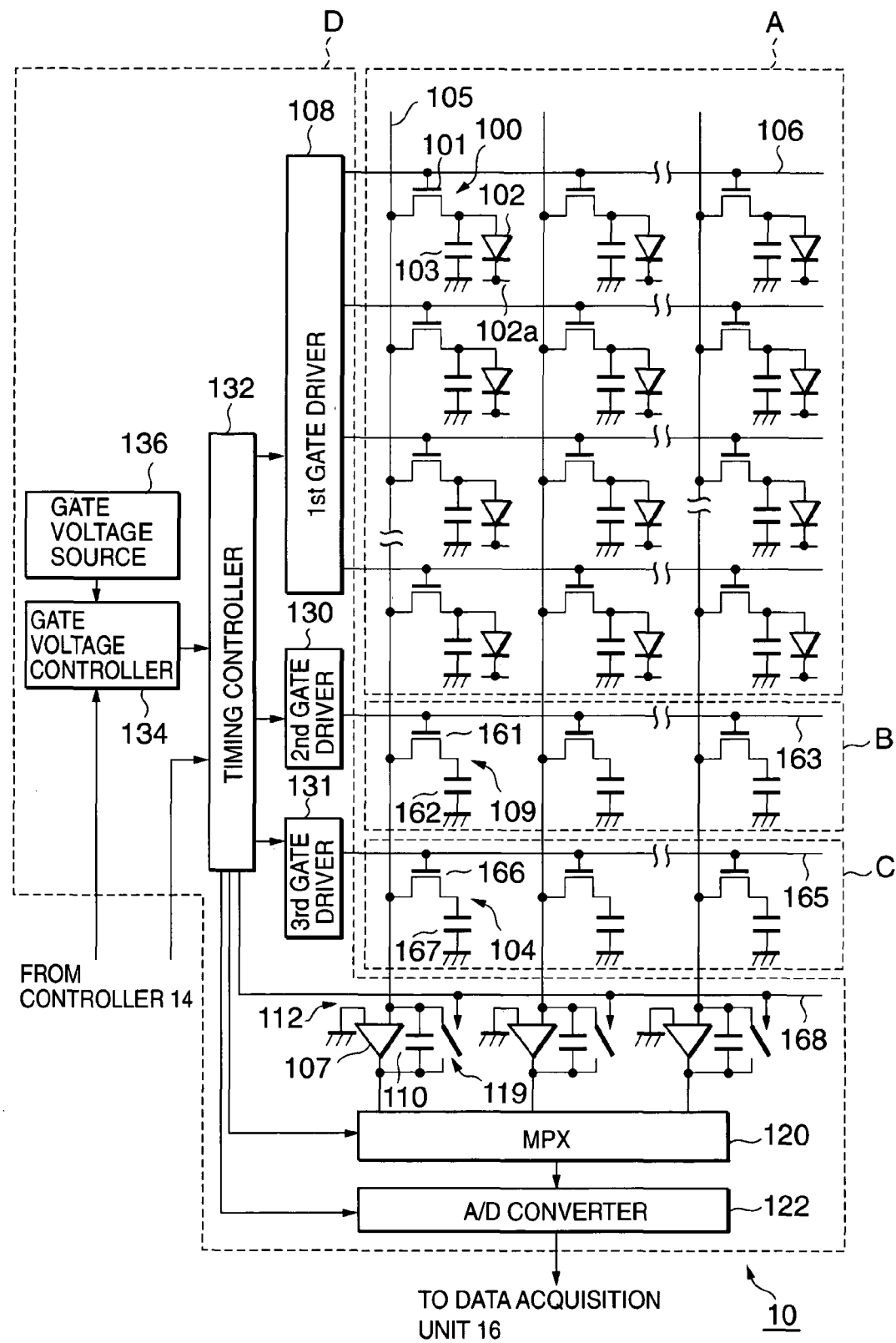
FIG. 3 is a block diagram showing an exemplary configuration of an X-ray detector according to the first embodiment of the present invention.

Turning now to FIG. 3, which is a block diagram showing an exemplary configuration of the X-ray detector 10 according to the first embodiment of the present invention. As shown, the X-ray detector 10 includes a detection area A, a first adjustment area B, a second adjustment area C, and a reading area D.

The detection area A has a plurality of first pixels 100 arrayed in a two-dimensional matrix. The detection area A further includes a plurality of signal lines 105 and a plurality of vertical select lines 106. The signal lines 105 are used for reading out signals from the first pixels 100 (charges stored in the first pixels 100), and the vertical select lines 106 are used for selecting a row where the signals are read out from the first pixels 100. Each of the first pixels 100 includes a signal-read TFT (hereinafter referred to as a first TFT) 101, a photoelectric conversion element 102, and a first capacitor 103. A drain terminal of the first TFT 101 is connected to one of the signal lines 105, and a gate terminal of the first TFT 101 is connected to one of the vertical select lines 106.

A source terminal of the first TFT 101 is connected to the photoelectric conversion element 102 and the first capacitor 103. The photoelectric conversion element 102 converts incoming radiation (X-ray) into a charge corresponding to the strength of the X-ray, and the first capacitor 103 stores the charge converted (or generated) in the photoelectric conversion element 102. The photoelectric conversion element 102 is formed of, for example, selenium which can directly convert an X-ray into a charge. Alternatively, the photoelectric conversion element 102 may convert indirectly the X-ray into the charge. In case of the indirect conversion type, the photoelectric conversion element 102 includes a fluorescent material for converting the X-ray into light and a photodiode for converting the converted light into the charge. Further, a terminal 102a of the photoelectric conversion element 102 is maintained at a predetermined potential. A side of the first capacitor 103 is connected to the source terminal of the first TFT 101 as described above. The other side of the first capacitor 103 is grounded or, may alternatively, be maintained at a predetermined potential.

The first adjustment area B has a plurality of second pixels 109 arrayed in a row. The second pixels 109 are dummy pixels and are not used for an incoming X-ray detection per se. The first adjustment area B further includes the plurality of signal lines 105 and a control line 163. The first adjustment area B may alternatively include more than one control lines. The control line 163 is used for canceling the charge injection caused by switching the first TFTs 101 on and off.

Each of the second pixels 109 includes a first adjustment TFT (hereinafter referred to as a second TFT) 161 and a second capacitor 162. A drain terminal of the second TFT 161 is connected to one of the signal lines 105, and a gate terminal of the second TFT 161 is connected to the control line 163. Further, a source terminal of the second TFT 161 is connected to the second capacitor 162, and each of the second pixels 109 does not include a photoelectric conversion element. Alternatively, however, each of the second pixels 109 may include a photoelectric conversion element, but should not be connected to the second TFT 161 or should not be configured to be operative to convert incoming radiation (X-ray) into a charge corresponding to the strength of the X-ray. Therefore, the second capacitor 162 does not store a charge converted (or generated) in a photoelectric conversion element. In other words, the second pixels 109 do not generate a charge resulting from a photoelectric conversion element.

Instead, each of the second pixels 109 generates only an offset charge resulting from the switching of the second TFT 161. As shown, a side of the second capacitor 162 is connected to the source terminal of the second TFT 161 as described above. The other side of the second capacitor 162 is grounded or, may alternatively, be maintained at a predetermined potential. The second capacitor 162 is also provided in each of the second pixels 109 and formed in the above manner only because the second capacitor 162 may be formed together with the first capacitor 103.

In addition, the second adjustment area C has a plurality of third pixels 104 arrayed in a row. The third pixels 104 are dummy pixels and are not used for an incoming X-ray detection per se. The second adjustment area C further includes the plurality of signal lines 105 and an offset adjustment line 165. The second adjustment area C may alternatively include more than one offset adjustment lines. Further, the offset adjustment line 165 is used for adjusting an offset component generated in the detection area A.

Each of the third pixels 104 includes a second adjustment TFT (hereinafter referred to as a third TFT) 166 and a third capacitor 167. As shown, a drain terminal of the third TFT 166 is connected to one of the signal lines 105, a gate terminal of the third TFT 166 is connected to the offset adjustment line 165, and a source terminal of the third TFT 166 is connected to the third capacitor 167. Each of the third pixels 104 does not include a photoelectric conversion element. Alternatively, however, each of the third pixels 104 may include a photoelectric conversion element, but should not be connected to the third TFT 166 or should not be configured to be operative to convert incoming radiation (X-ray) into a charge corresponding to the strength of the X-ray.

Therefore, the third capacitor 167 does not store a charge converted (or generated) in a photoelectric conversion element. In other words, the third pixels 104 do not generate a charge resulting from a photoelectric conversion element. Instead, each of the third pixels 104 generates only an offset charge resulting from the switching of the third TFT 166. In addition, a side of the third capacitor 167 is connected to the source terminal of the third TFT 166 as described above. The other side of the third capacitor 167 is grounded or, may alternatively, be maintained at a predetermined potential. The third capacitor 167 is also provided in each of the third pixels 104 and formed in the above manner only because the third capacitor 167 may be formed together with the first capacitor 103.

As described above, the second capacitors 162 in the first adjustment area B and the third capacitors 167 in the second adjustment area C may be formed (or manufactured) together (or through the same processes) with the first capacitors 103 in the detection area A. Therefore, each of the second capacitors 162 and the third capacitors 167 may have similar characteristics to those of each of the first capacitors 103. Similarly, the second TFTs 161 in the first adjustment area B and the third TFTs 166 in the second adjustment area C may be formed (or manufactured) together (or through the same processes) with the first TFTs 101 in the detection area A. Therefore, each of the second TFTs 161 and the third TFTs 166 may have similar characteristics to those of each of the first TFTs 101. However, the first TFTs 101, the second TFTs 161, and the third TFTs 166 may not necessarily be similar to one another in their configurations and/or their characteristics. Similarly, the first capacitors 103, the second capacitors 162, and the third capacitors 167 may not necessarily be similar to one another in their configurations and/or their characteristics. Further, the second TFTs 161 and the third TFTs 166 may not necessarily be formed or manufactured together with the first TFTs 101. Similarly, the second capacitors 162 and the third capacitors 167 may not necessarily be formed or manufactured together with the first capacitors 103.

As shown, the reading area D includes a first gate driver 108, a second gate driver 130, a third gate driver 131, a plurality of integrating circuits 112, a multiplexer 120, an analog-to-digital converter (hereinafter referred to as an A/D converter) 122, a timing controller 132, a gate voltage source 136, and a gate voltage controller 134.

The first gate driver 108 is connected to the vertical select lines 106, and selectively supplies (or impresses) a first predetermined voltage to each of the vertical select lines 106 in turn. The voltage supply is not be limited to the supply one by one line, but may also be applied to more than one line. Further, the first TFTs 101 connected with the vertical select line(s) 106 are switched on, in response to the first predetermined voltage supply from the first gate driver 108.

The second gate driver 130 is connected to the control line(s) 163, and supplies (or impresses) a second predetermined voltage to the control line(s) 163 at a first predetermined timing. The second TFTs 161 are controlled in response to the second predetermined voltage supply from the second gate driver 130.

The third gate driver 131 is connected to the offset adjustment line(s) 165, and supplies (or impresses) a third predetermined voltage to the offset adjustment line(s) 165 at a second predetermined timing. The third predetermined voltage may be negative in the first embodiment of the present invention. Further, the third TFTs 166 are controlled in response to the third predetermined voltage supply from the third gate driver 131.

The first, second, and third predetermined voltages will be determined as follows. The first predetermined voltage to be supplied from the first gate driver 108 is determined for switching on the first TFTs 101 so that the charges stored in the first capacitors 103 are discharged to the signal lines 105 through the first TFTs 101.

The second predetermined voltage to be supplied from the second gate driver 130 is determined in the following manner. As mentioned in the background of the invention, a predetermined amount of charge injection usually occurs when the first predetermined voltage is supplied to the vertical select line(s) 106. Such charge injection will influence the integrating circuits 112. In each of the integrating circuits 112, an integrating amplifier 107 may undesirably increase its output by a predetermined amount due to the charge injection.

To reduce the output of the integrating amplifier 107, the second predetermined voltage is determined so that a product obtained by multiplying a parasitic capacitance (or an apparent stray capacitance) generated between the control line 163 and each of the signal lines 105 with the second predetermined voltage becomes identical with a product obtained by multiplying another parasitic capacitance generated between the vertical select line(s) 106 and the each of the signal lines 105 with the first predetermined voltage supplied from the first gate driver 108.

The third predetermined voltage to be supplied from the third gate driver 131 is determined in the following manner. The third predetermined voltage is determined based on an idea about how much the output of each of the integrating amplifier 107 would be required to be reduced. To reduce the output of the integrating amplifier 107 by a required amount, it is considered about how much charge Q should be charged in an amplifying capacitor 110 of each of the integrating circuits 112.

Further, to charge such a charge Q in the amplifying capacitor 110, it is considered about how much voltage V should be supplied to the offset adjustment line 165 when there is still another parasitic capacitance generated between the offset adjustment line 165 and each of the signal lines 105. The voltage V becomes the third predetermined voltage. The offset adjustment may depend on the determination of the third predetermined voltage. When the first determined voltage is supplied to more than one vertical select line 106 at one time, the above calculation can also be applied according to an increase of the charge injection generated in the detection area A.

Back to the reading area D, as shown, each of the integrating circuits 112 includes the integrating amplifier 107, the amplifying capacitor 110, and a reset switch 119. The integrating amplifier 107 amplifies signals (charges) read out from one or more of the pixels 100 connected through a common signal line 105 with the integrating amplifier 107. The amplifying capacitor 110 is operative as a feedback capacitor of the integrating amplifier 107. Further, the reset switch 119 is provided in parallel with the amplifying capacitor 110.

The multiplexer 120 is connected to the integrating circuits 112, sequentially selects the amplified outputs of the integrating circuits 112 and supplies the A/D converter 122 with multiplexed signals. The A/D converter 122 converts the multiplexed signals in an analog form into digital signals.

In addition, the timing controller 132 controls the first gate driver 108 to selectively supply the first predetermined voltage with the vertical select lines 106. Further, the timing controller 132 controls the second gate driver 130 to supply the second predetermined voltage with the control line 163 during about the same period as the supply of the first predetermined voltage by the first gate driver 108. In other words, to be precise, the second predetermined voltage may be supplied in synchronization with the supply of the first predetermined voltage. Still further, the timing controller 132 controls the third gate driver 131 to supply the third predetermined voltage with the offset adjustment line 165 so as to adjust offset components in the integrating circuits 112.

In addition, the timing controller 132 controls the reset switches 119 with reset signals through a reset control line 168. The reset switches 119 are closed so as to reset the integrating circuits 112. Further, the timing controller 132 also controls the multiplexer 120 and the A/D converter 122.

The gate voltage source 136 generates a gate voltage, receives the gate voltage generated in the gate voltage source 136 and supplies the timing controller 132 with the first, second, third predetermined voltages so that these voltages are supplied to the vertical select lines 106, the control lines 163, and the offset adjustment lines 165 through the first gate driver 108, the second gate driver 130, and the third gate driver 131 at appropriate timings, respectively.

Figure 4:
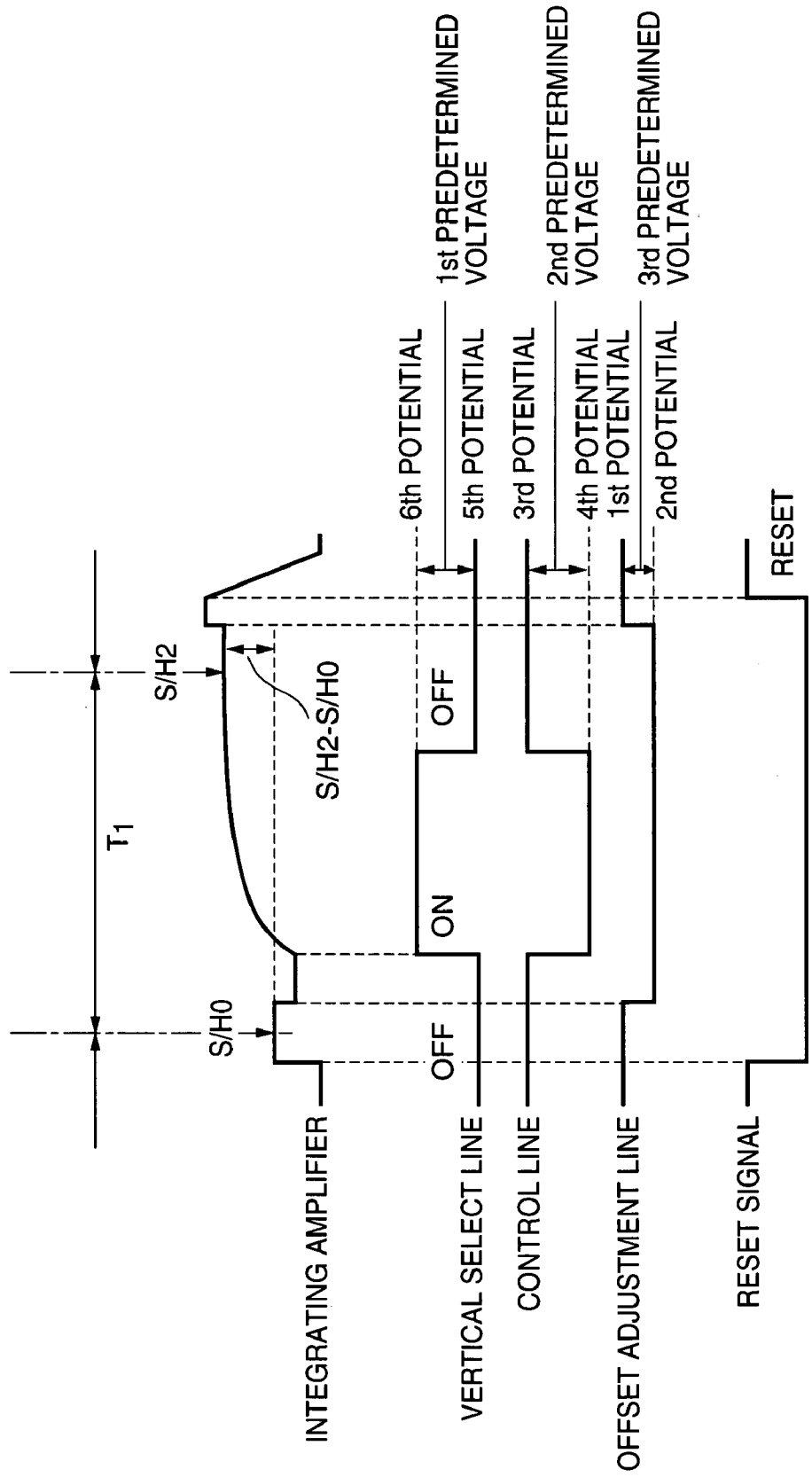
FIG. 4 is a timing chart showing an example of timing controls by a timing controller and a transition of an output of an integrating amplifier in a correlated-double-sampling processing according to the first embodiment of the present invention.

Next, the timing controls by the timing controller 132 will be described with a transition of the output of the integrating amplifier 107. FIG. 4 is a timing chart showing an example of the timing controls by the timing controller 132 and the transition of the output of the integrating amplifier 107 in the CDS processing according to the first embodiment of the present invention.

In the CDS processing, an output (a first output) of the integrating amplifier 107 is sampled and held before discharging the charges stored in the detection area A. Further, another output (a second output) of the integrating amplifier 107 is sampled and held after discharging the charges stored in the detection area A. The difference between the first output and the second output may be assumed to be a correction data.

In the following description with FIG. 4, only one column of the detection array in FIG. 3 will be described for explaining the first embodiment of the present invention. Before starting the operation, the reset switches 119 are closed so as to keep a reset status. Responsive to a release of the reset status by the timing controller 132, an output of the integrating amplifier 107 increases due to the capacitance of the capacitor 110. A first sampling is performed for this increased output of the integrating amplifier 107, and the sampled data (a sampling data S/HO) is held as the first sampling data. The sampling data S/HO may be stored in the correction data memory 15.

After the first sampling, the timing controller 132 controls the third gate driver 131 to supply the offset adjustment line 165 with the third predetermined voltage. Accordingly, a first potential of the offset adjustment line 165 is lowered to a second potential. Responsive to the potential decline on the offset adjustment line 165, the output of the integrating amplifier 107 decreases by a predetermined amount. As described before, this predetermined amount is something expected and determined first. Based on this expected decreasing amount, the second predetermined voltage is determined in the calculation manner described before.

After the supply of the third predetermined voltage, the timing controller 132 controls the second gate driver 130 to supply the control line 163 with the second predetermined voltage. Accordingly, a third potential of the control line 163 is lowered to a fourth potential. Immediately after the supply of the second predetermined voltage or in synchronization with the supply of the second predetermined voltage, the timing controller 132 controls the first gate driver 108 to supply the vertical select line 106 with the first predetermined voltage. Accordingly, a fifth potential of the vertical select line 106 is raised to a sixth potential. This indicates that the first TFT 101 is switched on so that the charge stored (or remained) in the first capacitor 103 is discharged into the signal line 105 through the first TFT 101. The charge discharged from the first capacitor 103 is supplied to the integrating circuit 112 through the signal line 105. As a result, the output of the integrating amplifier 107 gradually increases.

In accordance with the reading-out speed, the timing controller 132 controls the first gate driver 108 to terminate the supply of the first predetermined voltage to the vertical select line 106. Accordingly, the sixth potential of the vertical select line 106 is lowered to the original fifth potential. Immediately after the termination of the first predetermined voltage supply or in synchronization with the termination of the first predetermined voltage supply, the timing controller 132 controls the second gate driver 130 to terminate the supply of the second predetermined voltage to the control line 163. Accordingly, the fourth potential of the control line 163 is raised to the original third potential.

After the termination of the supply of the first and second predetermined voltages, a second sampling is performed for an output of the integrating amplifier 107 at this sampling timing. The sampled data (a sampling data S/H2) is held as the second sampling data. The difference between the sampling data S/H2 and the sampling data S/H0 stored in the correction data memory 15 is calculated and stored in the correction data memory 15. The sampling data S/H2 may also be stored in the correction data memory 15.

Immediately after the second sampling, the timing controller 132 controls the third gate driver 131 to terminate the supply of the third predetermined voltage to the offset adjustment line 165. Accordingly, the second potential of the offset adjustment line 165 is raised to the original first potential.

Responsive to the potential rise on the offset adjustment line 165, the output of the integrating amplifier 107 increases by a predetermined amount. This predetermined amount may be similar to the amount decreased at the time of the third predetermined voltage supply.

After the termination of the supply of the third predetermined voltage, the reset switches 119 are closed again so as to reset the output of the integrating amplifier 107. Accordingly, the output of the integrating amplifier gradually decreases to the original level.

In the above operation, the third predetermined voltage has been described to be supplied after the first sampling. However, the third predetermined voltage may be supplied any time in a period (T1) between the first sampling and the second sampling. In practice, however, it may be advantageous to supply the third predetermined voltage immediately after the first sampling. This is because it makes longer a period between the first sampling and the second sampling so as to reduce an affect on the second sampling due to rounding of pulses regarding the supply of the third predetermined voltage to the offset adjustment line 165.

Similarly, the supply of the third predetermined voltage has been described to be terminated immediately after the second sampling. However, the supply of the third predetermined voltage may be terminated any time in a period between the second sampling and a next first sampling for the next row of the vertical select lines 106. In practice, however, it may be advantageous to terminate the supply of the third predetermined voltage immediately after the second sampling as described before. This is because it makes longer a period between the second sampling and a next first sampling so as to reduce an affect on the next first sampling due to rounding of pulses regarding the termination of the supply of the third predetermined voltage to the offset adjustment line 165.

After the above operation has been completed, a similar operation will be repeated for each of the rest of the vertical select lines 106 one by one when the detection is performed every one vertical select line 106.

Since the third predetermined voltage may be negative, according to the supply of the third predetermined voltage, the output of the integrating amplifier 107 is adjusted to decrease in its level during a period of the supply of the third predetermined voltage. Since the X-ray detector 10 is not radiated by the X-ray generator 12 in the above sampling, the adjustment of the output of the integrating amplifier 107 may be assumed to be an adjustment of an offset component.

Figure 5:
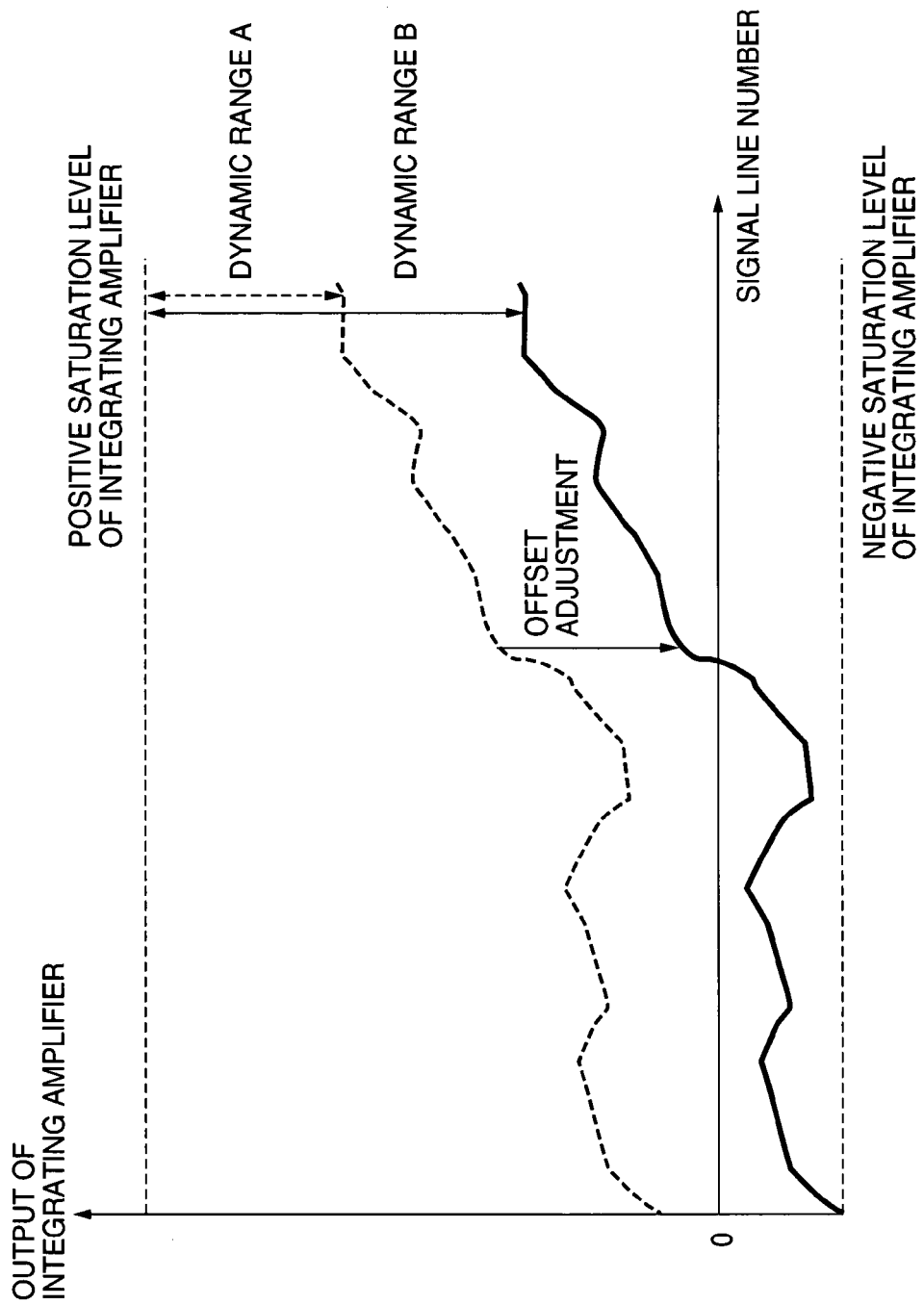
FIG. 5 is a graph showing an example of an offset adjustment according to the first embodiment of the present invention.

FIG. 5 is a graph showing an example of the offset adjustment according to the first embodiment of the present invention. When the above-described sampling is performed on all or a predetermined part of the signal lines 105 regarding a predetermined vertical select line 106, the output of the integrating amplifier 107 according to the offset adjustment is shown as a solid line in FIG. 5.

In the prior art detector, offset components (shown in a dashed line in FIG. 5) due to a fluctuation of the charge injection over the array of the detector has significantly occupied a dynamic range of an integrating amplifier. Such an occupation narrows a dynamic range (Dynamic Range A in FIG. 5) for detecting signals resulting from an X-ray radiation generated from an X-ray generator.

Comparing the solid line with the dashed line in FIG. 5, adjusted offset components (the output of the integrating amplifier 107 shown in the solid line) due to a fluctuation of the charge injection over the array of the detector is lowered according to the supply of the third predetermined voltage. A lowest offset level of the integrating amplifier 107 regarding one specific signal line 105 may be lowered to a negative saturation level of the integrating amplifier 107.

In FIG. 5, such a specific signal line 105 is a signal line 105 (signal line number 0 in FIG. 5) closest to the first gate driver 108. Since the offset adjustment is similarly implemented regarding every signal line 105, when the third predetermined voltage is supplied so as to lower the lowest offset level to the negative saturation level, a highest offset level of the integrating amplifier 107 is also lowered so that the integrating amplifier 107 can have a wider dynamic range (Dynamic Range B in FIG. 5) for detecting signals resulting from the X-ray radiation generated from the X-ray generator 12. This Dynamic Range B becomes a dynamic range allowed for the X-ray detector 10 as a whole to detect signals resulting from the X-ray radiation generated from the X-ray generator 12.

Although the highest offset level appears on a signal line 105 which is farthest from the first gate driver 108 (the most right) in FIG. 5, in some cases, an offset level on a signal line 105 situated in the middle along a vertical select line 106 may become the highest. The offset adjustment according to the first embodiment of the present invention may be implemented for each of the signal line 105 in every vertical select lines 106. Further, when the detection of the signals (or the discharge of the charges stored in the detection area A) resulting from the X-ray radiation generated from the X-ray generator 12 is implemented every two or more vertical select lines 106, the offset adjustment according to the first embodiment of the present invention may be implemented under such a condition.

In addition, the amount of the offset adjustment, such as the (S/H2-S/H0 or maybe S/H2) in FIG. 4, may be stored in the correction data memory 15. Therefore, in the event that the signal detection is selectively implemented every one vertical select line 106 and every two vertical select lines 106, the offset adjustment may be performed in advance under such two conditions. Accordingly, two types of the offset adjustment amounts may be stored in the correction data memory 15. The stored offset adjustment amounts can be selected one by the operator as a detection mode. Among such selectable detection modes, the configuration (hardware) of the X-ray detector 10 does not necessarily have to be changed. Only the third predetermined voltage may be required to be changed in accordance with the detection modes.

When the output of the integrating amplifier 107 is subject to the negative saturation level, a positive third predetermined voltage may be supplied to the offset adjustment line 165 so as to heighten the output of the integrating amplifier 107 towards the positive saturation level of the integrating amplifier 107.

Further, according to the first embodiment of the present invention, the supply of the second predetermined voltage functions to balance out the potential rise on the vertical select line 106 due to the supply of the first predetermined voltage. Therefore, the first adjustment area B is advantageous for avoiding the output of the integrating amplifier 107 from increasing and saturating at the positive saturation level.

Figure 6:
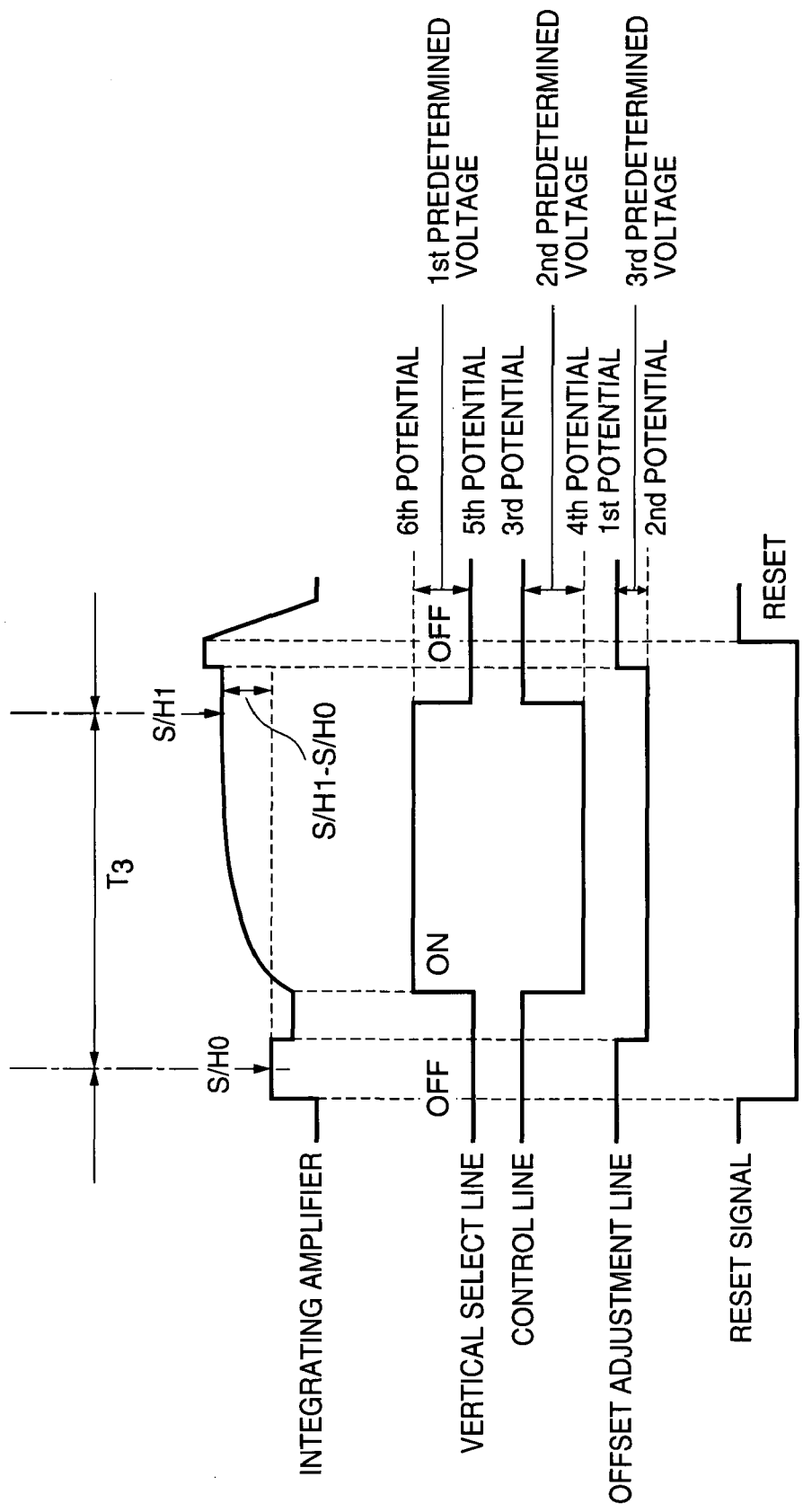
FIG. 6 is a timing chart showing an example of timing controls by the timing controller and a transition of an output of the integrating amplifier in a non-correlated-double-sampling processing according to the first embodiment of the present invention.

Turning now to FIG. 6, which is a timing chart showing an example of the timing controls by the timing controller 132 and the transition of the output of the integrating amplifier 107 in a non-CDS processing according to the first embodiment of the present invention.

In the non-CDS processing, a timing of a second sampling for a sampling data S/H1 is different from the timing of the second sampling for the sampling data S/H2 in the CDS processing. In FIG. 6, the second sampling is performed for an output of the integrating amplifier 107 before the termination of the supply of the first and second predetermined voltages. The sampled data (the sampling data S/H1) is held as a second sampling data. In the case shown in FIG. 6, the supply of the second predetermined voltage is synchronized with the supply of the first predetermined voltage as similar to the case shown in FIG. 4.

Therefore, the sampling data S/H1 is identical with the sampling data S/H2. The difference between the sampling data S/H0 described before and the sampling data S/H1 is calculated and stored in the correction data memory 15. The sampling data S/H1 may also be stored in the correction data memory 15.

The sampling before the termination of the supply of the first and second predetermined voltages is advantageous when the charges in the detection area A are read out at a high speed, such as, for example, 30 frames per second or 60 frames per second. When the charges in the detection area A are read out at a high speed, the switching of the first TFTs 101 are made quickly. This indicates that there may not be enough time to sample the sampling data S/H2 after the termination of the supply of the first and second predetermined voltages. Considering a pulse rounding resulting from the termination of the supply of the first and second predetermined voltages, it may not be possible to sample an accurate data as the sampling data S/H2. Therefore, using the sampling data S/H1 sampled and held before the termination of the supply of the first and second predetermined voltages is advantageous for the offset adjustment.

As similar to the case shown in FIG. 4, the third predetermined voltage may be supplied any time in a period (T3) between the first sampling for the sampling data S/H0 and the second sampling for the sampling data S/H1. In practice, however, it may be advantageous to supply the third predetermined voltage immediately after the first sampling.

Further, the supply of the third predetermined voltage may be terminated any time in a period between the second sampling for the sampling data S/H1 and a next first sampling for the next row of the vertical select lines 106. In practice, however, it may be advantageous to terminate the supply of the third predetermined voltage immediately after the second sampling as described before.

Operations shown in FIG. 6 other than the operation described above are similar to the operations described for FIG. 4. Accordingly, an explanation for such similar operations is omitted herein.

Second Embodiment

In the first embodiment of the present invention, the first adjustment area B is provided in the X-ray detector 10. However, embodiments of the present invention may not require a function of the first adjustment area B regarding the supply of the second predetermined voltage.

Figure 7:
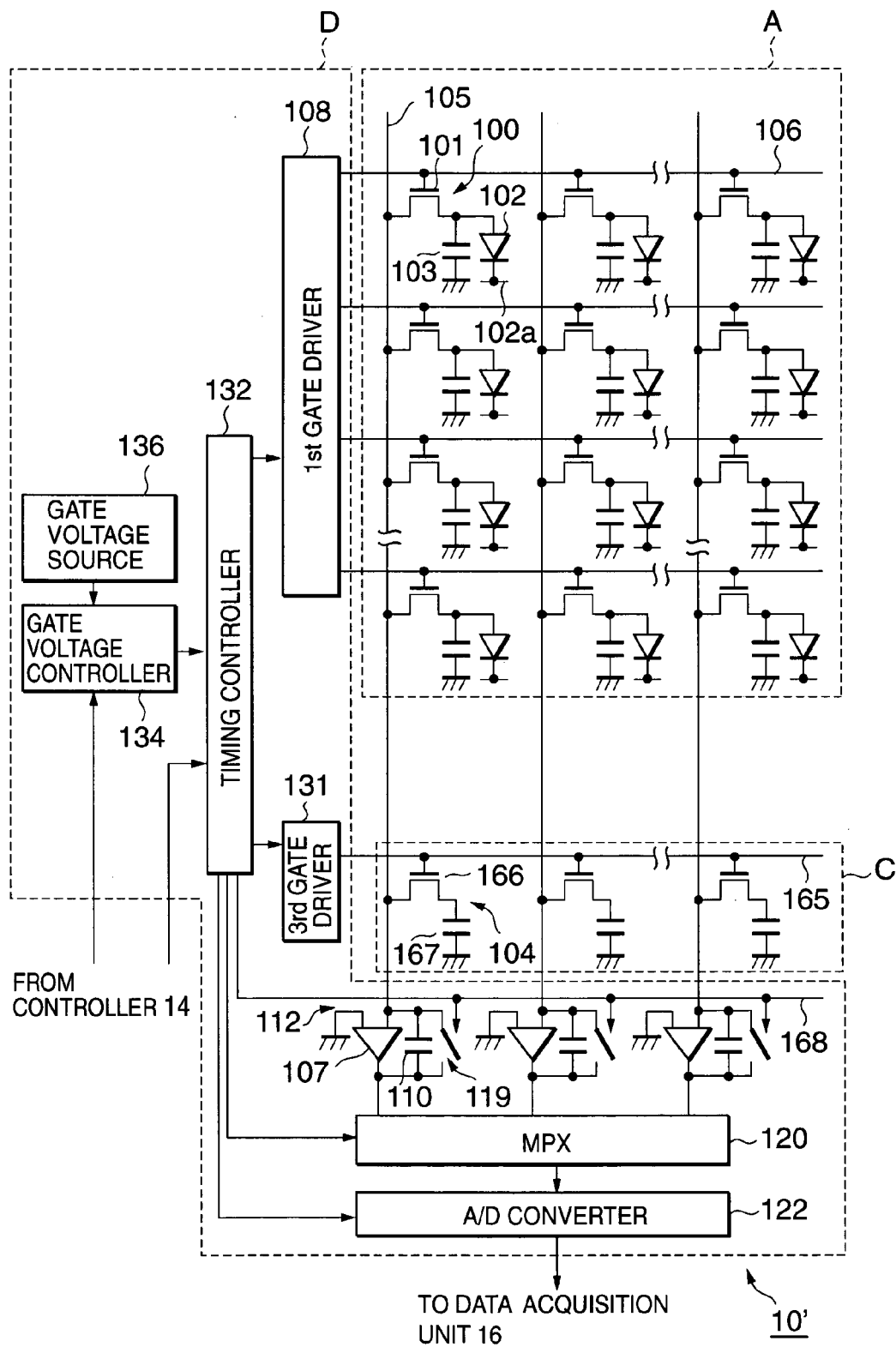
FIG. 7 is a block diagram showing another exemplary configuration of the X-ray detector according to a second embodiment of the present invention.

Turning now to FIG. 7, which is a block diagram showing another exemplary configuration of the X-ray detector 10 according to a second embodiment of the present invention. An X-ray detector 10' according to the second embodiment of the present invention does not include the first detection area B and the second gate driver 130 both of which have been included in the X-ray detector 10 shown in FIG. 3 according to the first embodiment of the present invention.

Operations of the X-ray detector 10' are similar to the operation of the X-ray detector 10 shown in FIG. 3, except for the operations regarding the first adjustment area B and the second gate driver 130. Therefore, the operations of the X-ray detector 10' shown in FIG. 7 are omitted herein, except for timing controls by the timing controller 132.

Figure 8:
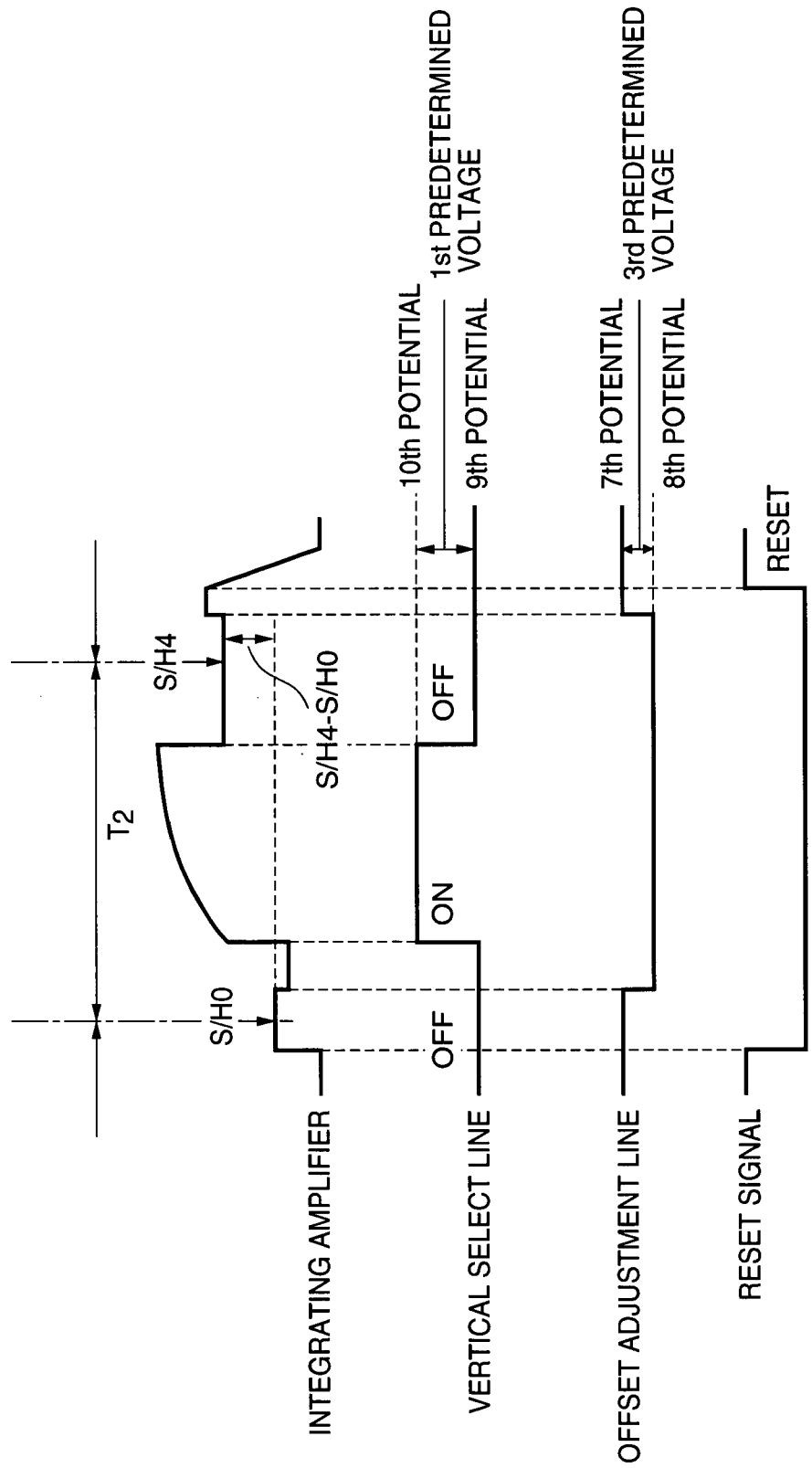
FIG. 8 is a timing chart showing an example of timing controls by the timing controller and a transition of an output of the integrating amplifier in the correlated-double-sampling processing according to the second embodiment of the present invention.

FIG. 8 is a timing chart showing an example of the timing controls by the timing controller 132 and a transition of an output of the integrating amplifier 107 in the CDS processing according to the second embodiment of the present invention.

As similar to the first embodiment, in the CDS processing, an output (a first output) of the integrating amplifier 107 is sampled and held before discharging the charges stored in the detection area A. Further, another output (a second output) of the integrating amplifier 107 is sampled and held after discharging the charges stored in the detection area A. The difference between the first output and the second output may be assumed to be a correction data.

In the following description with FIG. 8, only one column of the detection array in FIG. 7 will be described for explaining the second embodiment of the present invention. Before starting the operation, the reset switches 119 are closed so as to keep a reset status. Responsive to a release of the reset status by the timing controller 132, an output of the integrating amplifier 107 increases due to the capacitance of the capacitor 110. A first sampling is performed for this increased output of the integrating amplifier 107. The sampled data (a sampling data S/H0) is held as the first sampling data. The sampling data S/H0 may be stored in the correction data memory 15.

After the first sampling, the timing controller 132 controls the third gate driver 131 to supply the offset adjustment line 165 with the third predetermined voltage. Accordingly, a seventh potential of the offset adjustment line 165 is lowered to an eighth potential. Responsive to the potential decline on the offset adjustment line 165, the output of the integrating amplifier 107 decreases by a predetermined amount. As described in the first embodiment, this predetermined amount is something expected and determined first. Based on this expected decreasing amount, the second predetermined voltage is determined in the calculation manner described in the first embodiment.

After the supply of the third predetermined voltage, the timing controller 132 controls the first gate driver 108 to supply the vertical select line 106 with the first predetermined voltage. Accordingly, a ninth potential of the vertical select line 106 is raised to a tenth potential. Responsive to the potential rise on the vertical select line 106, the output of the integrating amplifier 107 increases by a predetermined amount. This predetermined amount may be determined by multiplying a parasitic capacitance generated between the vertical select line 106 and the signal line 105 with the first predetermined voltage. The potential rise on the vertical select line 106 indicates that the first TFT 101 is switched on so that the charge stored (or remained) in the first capacitor 103 is discharged into the signal line 105 through the first TFT 101. The charge discharged from the first capacitor 103 is supplied to the integrating circuit 112 through the signal line 105. As a result, the output of the integrating amplifier 107 gradually increases.

In accordance with the reading-out speed, the timing controller 132 controls the first gate driver 108 to terminate the supply of the first predetermined voltage to the vertical select line 106. Accordingly, the tenth potential of the vertical select line 106 is lowered to the original ninth potential. Responsive to the potential decline on the vertical select line 106, the output of the integrating amplifier 107 decreases by a predetermined amount. This predetermined amount may be similar to the amount increased at the time of the first predetermined voltage supply.

After the termination of the supply of the first predetermined voltage, a second sampling is performed for an output of the integrating amplifier 107 at this sampling timing, and the sampled data (a sampling data S/H4) is held as the second sampling data. The difference between the sampling data S/H4 and the sampling data S/H0 stored in the correction data memory 15 is calculated and stored in the correction data memory 15. The sampling data S/H4 may also be stored in the correction data memory 15.

Immediately after the second sampling, the timing controller 132 controls the third gate driver 131 to terminate the supply of the third predetermined voltage to the offset adjustment line 165. Accordingly, the eighth potential of the offset adjustment line 165 is raised to the original seventh potential.

Responsive to the potential rise on the offset adjustment line 165, the output of the integrating amplifier 107 increases by a predetermined amount. This predetermined amount may be similar to the amount decreased at the time of the third predetermined voltage supply.

After the termination of the supply of the third predetermined voltage, the reset switches 119 are closed again so as to reset the output of the integrating amplifier 107. Accordingly, the output of the integrating amplifier gradually decreases to the original level.

In the above operation, the third predetermined voltage has been described to be supplied after the first sampling. In more detail, the third predetermined voltage may be supplied any time in a period (T2) between the first sampling and the second sampling. In practice, however, it may be advantageous to supply the third predetermined voltage immediately after the first sampling. This is because it makes longer a period between the first sampling and the second sampling so as to reduce an affect on the second sampling due to rounding of pulses regarding the supply of the third predetermined voltage to the offset adjustment line 165.

Similarly, the supply of the third predetermined voltage has been described to be terminated immediately after the second sampling. However, the supply of the third predetermined voltage may be terminated any time in a period between the second sampling and a next first sampling for the next row of the vertical select lines 106. In practice, however, it may be advantageous to terminate the supply of the third predetermined voltage immediately after the second sampling as described before. This is because it makes longer a period between the second sampling and a next first sampling so as to reduce an affect on the next first sampling due to rounding of pulses regarding the termination of the supply of the third predetermined voltage to the offset adjustment line 165.

After the above operation has been completed, a similar operation will be repeated for each of the rest of the vertical select lines 106 one by one when the detection is performed every one vertical select line 106.

Figure 9:
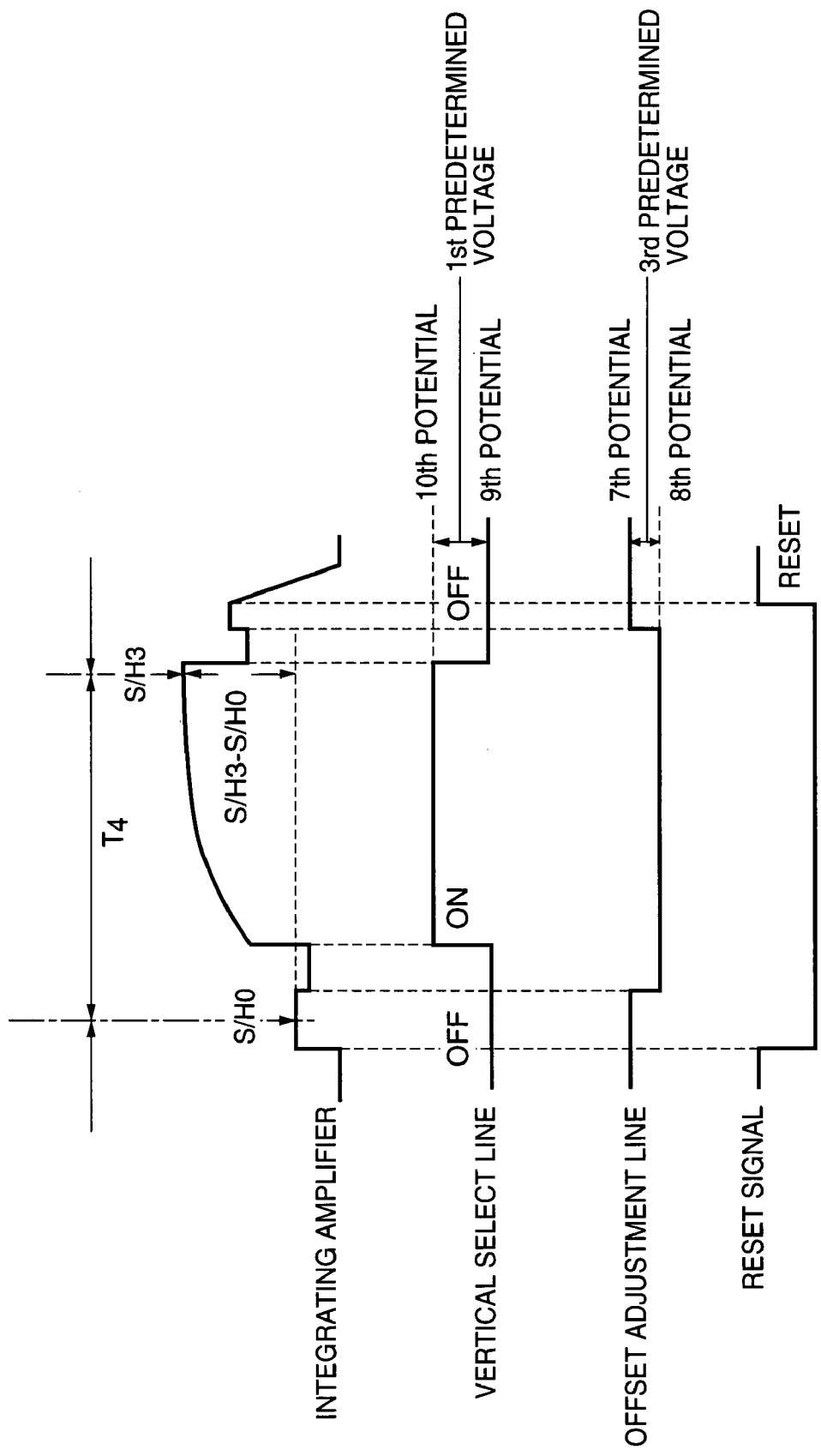
FIG. 9 is a timing chart showing an example of timing controls by the timing controller and a transition of an output of the integrating amplifier in the non-correlated-double-sampling processing according to the second embodiment of the present invention.

Next, FIG. 9 is a timing chart showing an example of the timing controls by the timing controller 132 and the transition of the output of the integrating amplifier 107 in the non-CDS processing according to the second embodiment of the present invention.

In the non-CDS processing, a timing of a second sampling for a sampling data S/H3 is different from the timing of the second sampling for the sampling data S/H4 in the CDS processing. In FIG. 9, the second sampling is performed for an output of the integrating amplifier 107 before the termination of the supply of the first predetermined voltage, and the sampled data (the sampling data S/H3) is held as a second sampling data. The difference between the sampling data S/H0 described before and the sampling data S/H3 is calculated and stored in the correction data memory 15. The sampling data S/H3 may also be stored in the correction data memory 15.

As similar to the case shown in FIG. 8, the third predetermined voltage may be supplied any time in a period (T4) between the first sampling for the sampling data S/H0 and the second sampling for the sampling data S/H3. In practice, however, it may be advantageous to supply the third predetermined voltage immediately after the first sampling.

Further, the supply of the third predetermined voltage may be terminated any time in a period between the second sampling for the sampling data S/H3 and a next first sampling for the next row of the vertical select lines 106. In practice, however, it may be advantageous to terminate the supply of the third predetermined voltage immediately after the second sampling as described before.

Operations shown in FIG. 9 other than the operation described is similar to the operations described for FIG. 8. Accordingly, an explanation for such similar operations is omitted herein.

Third Embodiment

Figure 10:
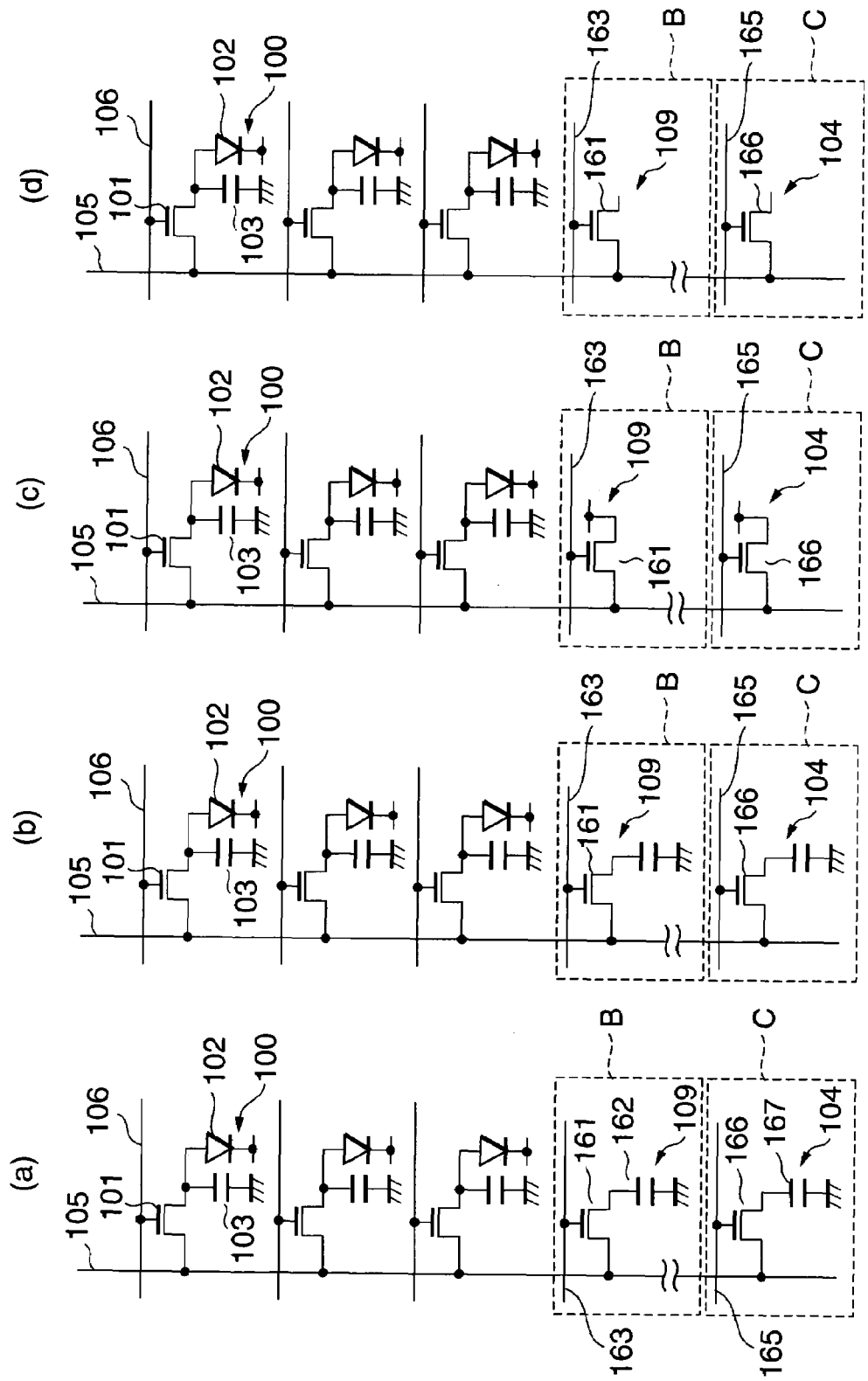
FIG. 10 is an illustration showing various types of exemplary configurations of part of an array of the X-ray detector according to a third embodiment of the present invention.

Turning next to FIG. 10, which is an illustration showing various types of exemplary configurations of part of an array of the X-ray detector 10 according to a third embodiment of the present invention.

In the first embodiment of the present invention, the second pixel 109 in the first adjustment area B was described to include the second TFT 161 and the second capacitor 162 as shown in FIG. 10(*a*). Further, the third pixel 104 in the second adjustment area C was described to include the third TFT 166 and the third capacitor 167 as shown in FIG. 10(*a*). However, the second capacitor 162 and the third capacitor 167 may not be required for functions of the second pixel 109 and the third pixel 104, respectively.

The second capacitor 162 and the third capacitor 167 may be provided only because it would be easier to form or manufacture such an array if the second capacitor 162 and the third capacitor 167 are included in the array as similar to the first pixel 100 since it is not necessary to change a manufacturing facility. Therefore, the second pixel 109 may not include the second capacitor 162 and the source terminal of the second TFT 161 may be grounded as shown in FIG. 10(*b*). Further, for the same reason, the third pixel 104 may not include the third capacitor 167 and the source terminal of the third TFT 166 may be grounded as shown in FIG. 10(*b*).

Alternatively, when the second pixel 109 does not include the second capacitor 162, the source terminal of the second TFT 161 is maintained at a predetermined potential as shown in FIG. 10(*c*). Further, when the third pixel 104 does not include the third capacitor 167, the source terminal of the third TFT 166 is maintained at a predetermined potential as shown in FIG. 10(*c*). Another alternative configuration of the second pixel 109 and the third pixel 104 is as follows.

When the second pixel 109 does not include the second capacitor 162, the source terminal of the second TFT 161 is open as shown in FIG. 10(*d*). Further, when the third pixel 104 does not include the third capacitor 167, the source terminal of the third TFT 166 is open as shown in FIG. 10(*d*). The configuration of the third pixel 104 is not required to be identical with nor similar to the configuration of the second pixel 109. For example, any one of the configurations of the third pixel 104 shown in (a) to (d) of FIG. 10 may be used to combine with any one of the configurations of the second pixel 109 shown in (a) to (d) of FIG. 10.

In addition, when a plurality of the third pixels 104 are provided for each of the signal lines 105, any combination of the configurations of the third pixel 104 shown in (a) to (d) of FIG. 10 may also be applied to such a plurality of the third pixels 104. Also, when a plurality of the second pixels 109 are provided for each of the signal lines 105, any combination of the configurations of the second pixel 109 shown in (a) to (d) of FIG. 10 may also be applied to such a plurality of the second pixels 109.

Fourth Embodiment

The first adjustment area B may not include the second pixels 109. Further, the second adjustment area C may not include the third pixels 104. As described in the first embodiment of the present invention, the first adjustment area B and the second adjustment area C function to generate predetermined charges to decrease or increase the output of the integrating amplifier 107. The predetermined charge to be generated in the first adjustment area B is determined by a relationship between the parasitic capacitance generated between the control line 163 and each of the signal lines 105 and the second predetermined voltage to be supplied on the control line 163. The predetermined charge to be generated in the second adjustment area C is determined by a relationship between the parasitic capacitance generated between the offset adjustment line 165 and each of the signal lines 105 and the third predetermined voltage to be supplied on the offset adjustment line 165. Therefore, the predetermined charge to be generated may be controlled by either the parasitic capacitance or the third (second) predetermined voltage.

Figure 11:
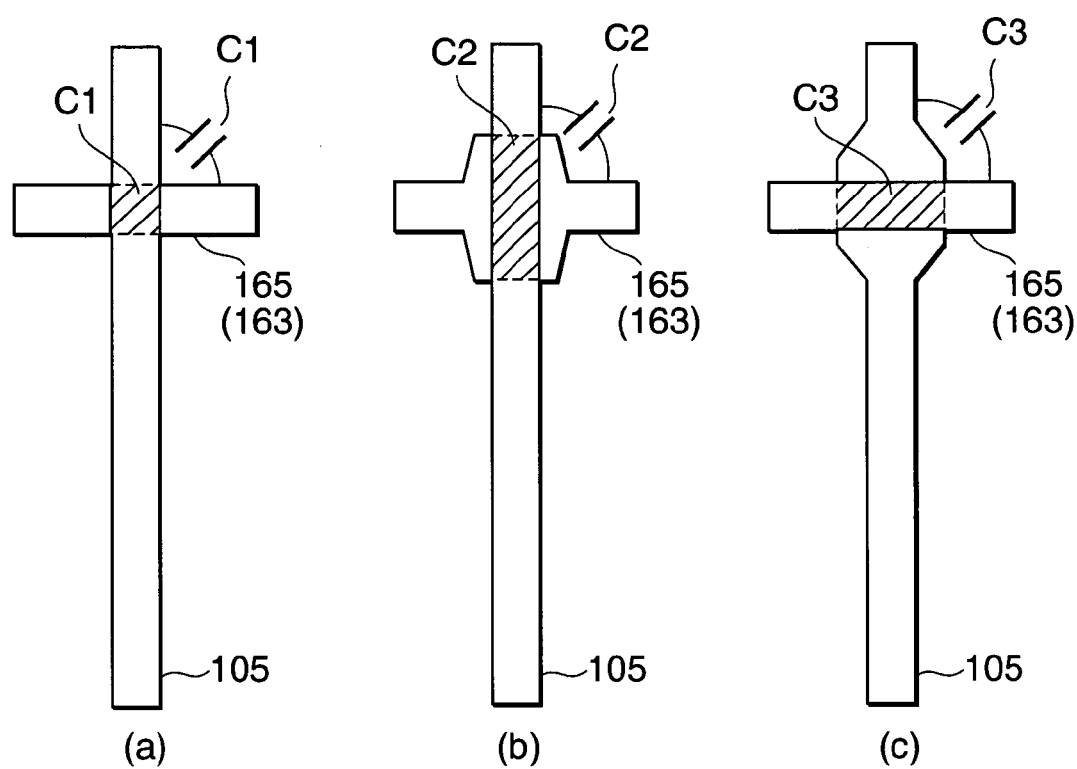
FIG. 11 is an illustration showing examples of creating a parasitic capacitance according to a fourth embodiment of the present invention.

FIG. 11 is an illustration showing examples of creating a parasitic capacitance according to a fourth embodiment of the present invention. As shown in FIG. 11(a), even when the signal line 105 with a regular width and the offset adjustment line 165 (a control line 163) with a regular width are provided without the third TFT 166 (the second TFT 161), a parasitic capacitance C1 may be generated even if it is small. Therefore, the charge to be generated in the second adjustment area C (the first adjustment area B) may be controlled by changing the third (second) predetermined voltage.

Alternatively, a parasitic capacitance C2 may be generated (or created) by changing a width of the offset adjustment line 165 (the control line 163) only at crossing parts with the signal lines 105 as shown in FIG. 11(b). Changing the third (second) predetermined voltage based on the parasitic capacitance C2 according to the line width change, the charge to be generated in the second adjustment area C (the first adjustment area B) may be controlled and adjusted to an appropriate value.

Still further, instead of changing a width of the offset adjustment line 165 (the control line 163), a width of the signal lines 105 may be changed only at crossing parts with the offset adjustment line 165 (the control line 163) as shown in FIG. 11(c). Changing the third (second) predetermined voltage based on a parasitic capacitance C3 according to the line width change, the charge to be generated in the second adjustment area C (the first adjustment area B) may be controlled and adjusted to an appropriate value.

Figure 12:
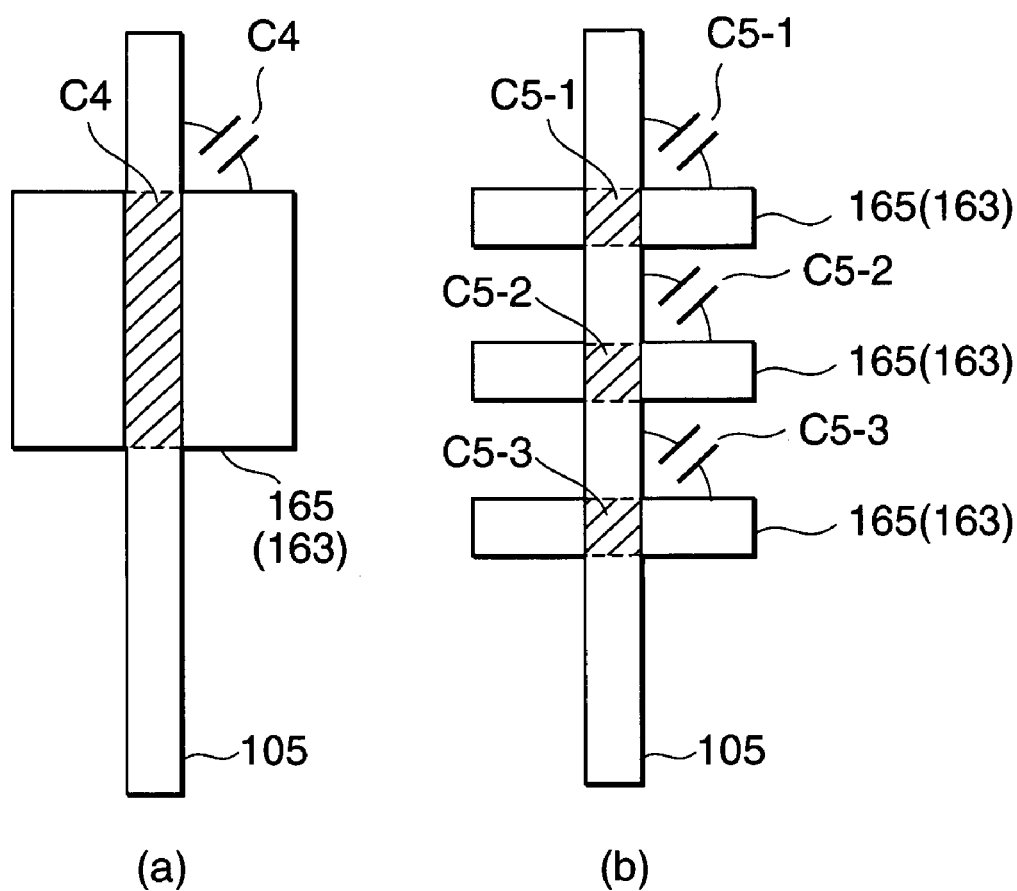
FIG. 12 is an illustration showing further examples of creating a parasitic capacitance according to the fourth embodiment of the present invention.

Next, FIG. 12 is an illustration showing further examples of creating a parasitic capacitance according to the fourth embodiment of the present invention. In addition to the exemplary configurations in FIG. 11, a parasitic capacitance C4 may be generated (or created) by changing a width of the offset adjustment line 165 (the control line 163) throughout the offset adjustment line 165 (the control line 163) as shown in FIG. 12(a). Changing the third (second) predetermined voltage based on the parasitic capacitance C4 according to the line width change, the charge to be generated in the second adjustment area C (the first adjustment area B) may be controlled and adjusted to an appropriate value.

Further, parasitic capacitances C5-1 to C5-N (e.g., N=3, in FIG. 12) may be generated (or created) by providing a plurality of the offset adjustment lines 165 (the control lines 163) as shown in FIG. 12(b). Changing the third (second) predetermined voltage based on the parasitic capacitances C5-1 to C5-N, the charge to be generated in the second adjustment area C (the first adjustment area B) may be controlled and adjusted to an appropriate value. The third (second) predetermined voltage may be controlled for each of the plurality of the offset adjustment lines 165 (the control lines 163) if necessary.

Regarding the parasitic capacitances, the larger the parasitic capacitances parasitized on the signal lines 105 are, the more noises may be included in signals in the signal lines 105. Therefore, it may be preferable to control to the parasitic capacitances parasitized on the signal lines 105 to be small.

Fifth Embodiment

In general, the offset fluctuation resulting from the fluctuation in amounts of the charge injection over the array of pixels may occur both along a vertical direction and along a horizontal direction. The vertical direction is usually a direction along the signal lines 105 in which signals (charges) are read out. The horizontal line is usually a direction along the vertical select lines 106.

Figure 13:
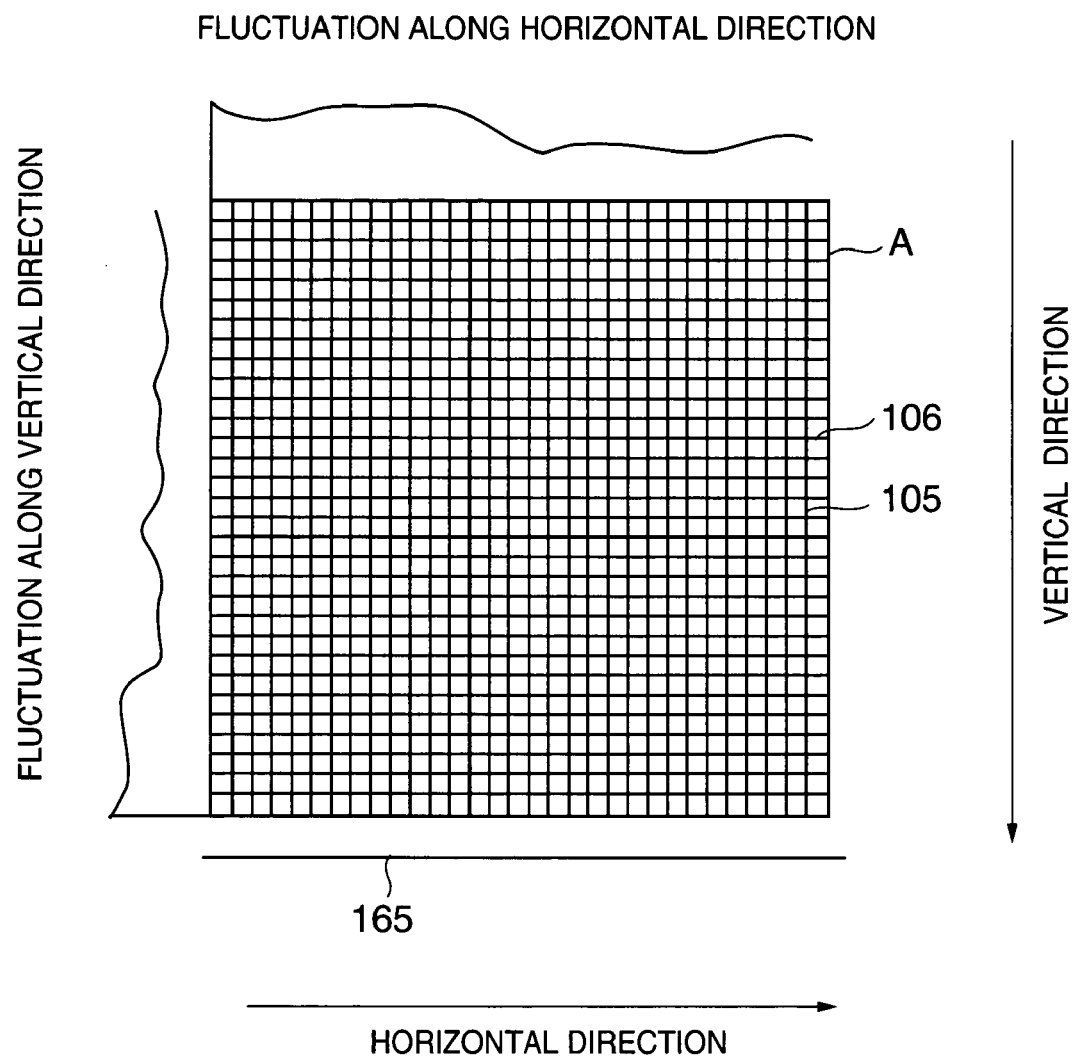
FIG. 13 is an illustration showing an example of typical offset fluctuations over a detection area along a vertical direction and a horizontal direction, respectively.

FIG. 13 is an illustration showing an example of typical offset fluctuations over the detection area A along the vertical direction and the horizontal direction, respectively. As shown in FIG. 13, the offset fluctuation along the vertical direction results from differences among offset components on the vertical select lines 106. Therefore, the offset fluctuation along the vertical direction may be adjusted by changing the third predetermined voltage to be supplied on the offset adjustment line 165 with respect to each of the vertical select lines 106.

Regarding the offset fluctuation along the horizontal direction, the offset adjustment line 165 may be divided into a plurality of divided offset adjustment lines. Accordingly, the offset fluctuation along the horizontal direction may be adjusted better than the adjustment with the offset adjustment line 165 which is a single line along the horizontal direction.

Figure 14:
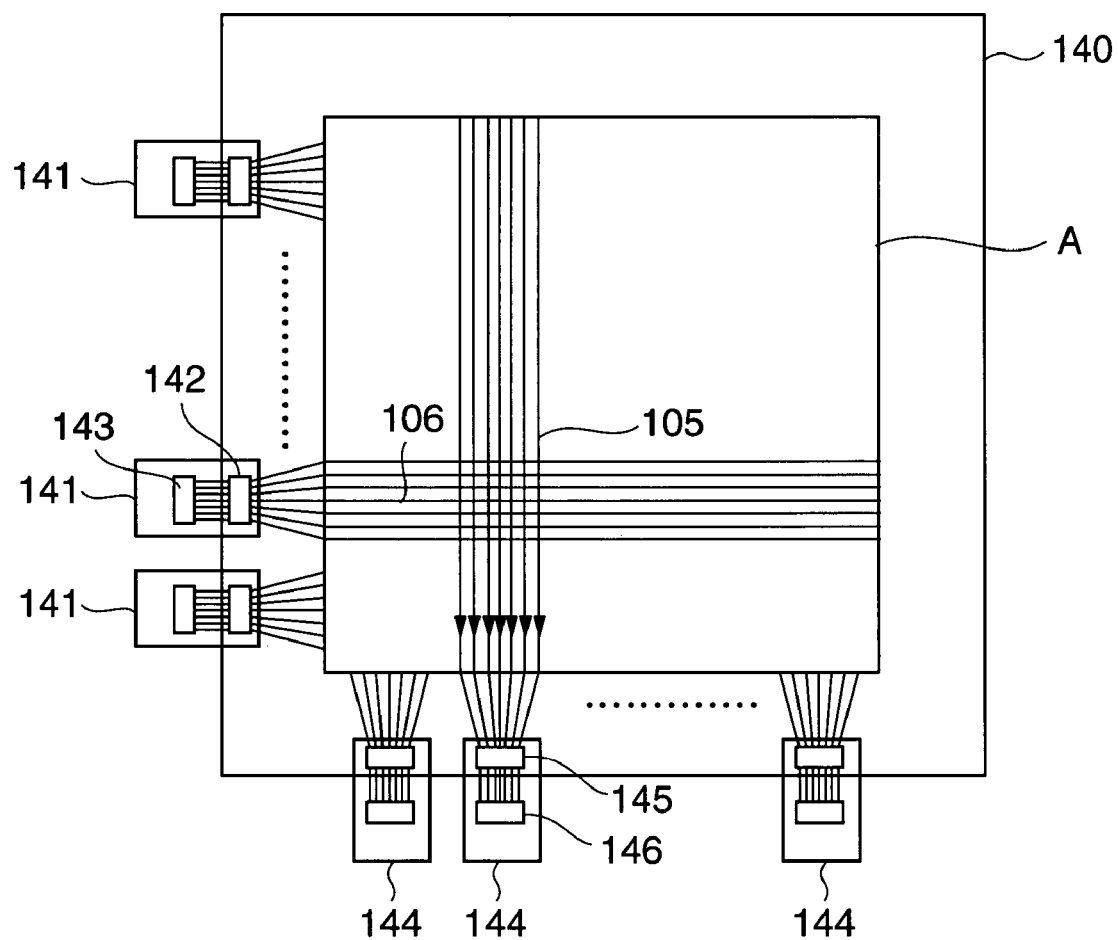
FIG. 14 is an illustration showing an exemplary configuration of the X-ray detector according to a fifth embodiment of the present invention.

FIG. 14 is an illustration showing an exemplary configuration of the X-ray detector 10 according to a fifth embodiment of the present invention. The detection area A is formed on one surface of a glass substrate 140. The vertical select lines 106 in the detection area A are connected to a plurality of driver TABs 141. As shown, each of the driver TABs 141 includes a driver PAD 142 and a driver integrated circuit 143. The driver integrated circuit 143 includes the first gate driver 108. Further, the driver integrated circuit 143 in a specific driver TAB 141 may also include the second gate driver 130.

Therefore, to be precise, each predetermined number of the vertical select lines 106 are connected to one driver integrated circuit 143 through one driver PAD 142 in one driver TAB 141 as shown in FIG. 14. Similarly, the signal lines 105 in the detection area A are connected to a plurality of integrating TABs 144. Each of the integrating TABs 144 may include an integrating PAD 145 and a integrating integrated circuit 146. The integrating integrated circuit 146 may also include the integrating circuit 112. Further, the integrating integrated circuit 146 may include the third gate driver 131. Therefore, to be precise, each predetermined number of the signal lines 105 are connected to one integrating integrated circuit 146 through one integrating PAD 145 in one integrating TAB 144 as shown in FIG. 14. The control line 163 and the divided offset adjustment lines are omitted in FIG. 14, but will be described with reference to FIG. 15.

Figure 15:
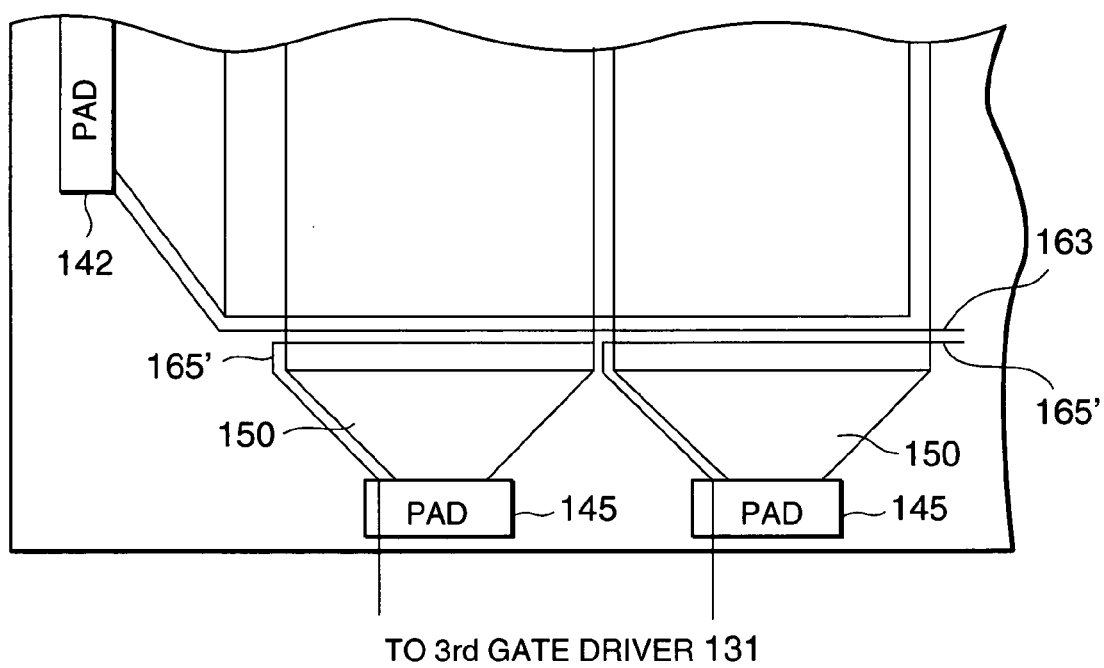
FIG. 15 is an illustration showing an example of divided offset adjustment lines according to the fifth embodiment of the present invention.

FIG. 15 is an illustration showing an example of the divided offset adjustment lines according to the fifth embodiment of the present invention. Each predetermined number of the signal lines 105 are bundled together in a distribution element 150 and connected to the integrating PAD 145. As shown in FIG. 15, the control line 163 is provided commonly among the integrating PAD 145. Further, the second predetermined voltage is supplied on the control line 163 through the driver PAD 142.

On the other hand, a divided offset adjustment line 165' (the divided offset adjustment line) is provided for each of the integrating PADs 145. Each divided offset adjustment line 165' intersects with the each predetermined number of the signal lines 105. At each crossing point, there may be provided any form of the third pixel 104 as described above. Otherwise, one of the configurations shown in FIGS. 11 and 12 may be provided as an alternative form. Each divided offset adjustment line 165' may be connected to one integrating PAD 145 and further to one third gate driver 131. Only one third gate driver 131 has been described before. In this case, however, there may be provided a plurality of third gate drivers 131 so as to supply a different third predetermined voltage on each divided offset adjustment line 165' appropriately. That is, an appropriate third predetermined voltage may be supplied on each divided offset adjustment line 165' for each integrating PAD 145 (or each integrating TAB 144). Each of the third gate drivers 131 may be provided in each integrating integrated circuit 146. In this case, an appropriate third predetermined voltage may be supplied on each divided offset adjustment line 165' for each integrating integrated circuit 146 (or for each integrating amplifier 107). Otherwise, the one or more divided offset adjustment lines 165' may be connected to the driver PAD 142 and further to a corresponding number of the third gate drivers 131.

When the plurality of divided offset adjustment lines 165' are provided along the horizontal direction, instead of only one offset adjustment line 165, such plurality of divided offset adjustment lines 165' may be provided one for each integrating amplifier 107. The more the divided offset adjustment lines are provided, the more preferably the offset adjustment can be implemented.

Figure 16:
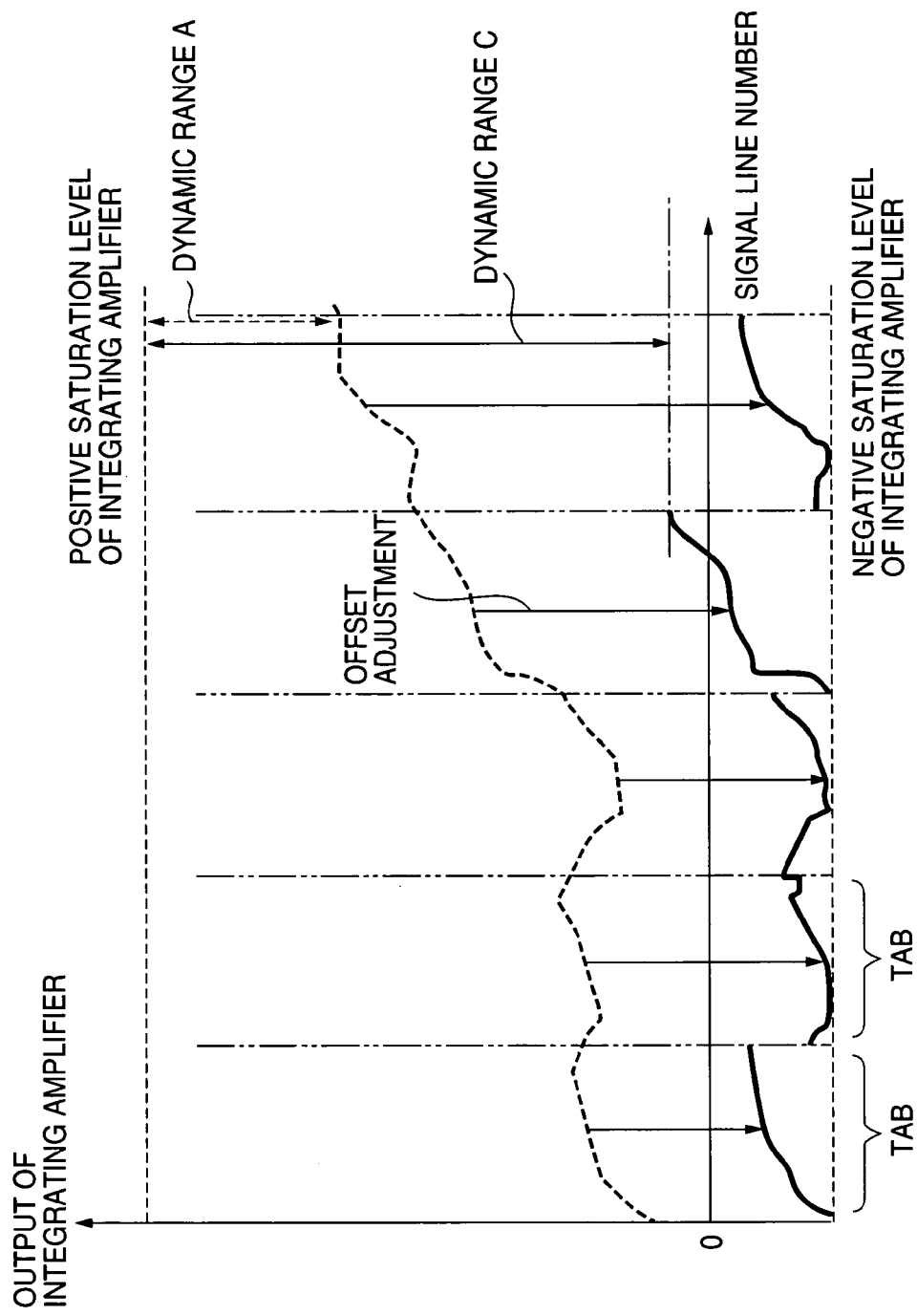
FIG. 16 is a graph showing another example of an offset adjustment according to the fifth embodiment of the present invention.

Next, FIG. 16 is a graph showing another example of an offset adjustment according to the fifth embodiment of the present invention. When the divided offset adjustment line 165' is provided for each predetermined number of the signal lines 105, in other words, when the divided offset adjustment line 165' is provided for each integrating TAB 142 (or each integrating PAD 145), the offset adjustment is implemented in each integrating TAB 142. Accordingly, a result of the offset adjustment according to the fifth embodiment of the present invention is shown as a solid line in FIG. 16.

In the prior art detector, offset components shown in a dashed line in FIG. 16 (as already shown in the dashed line in FIG. 5) has significantly occupied a dynamic range of an integrating amplifier. Comparing the solid line with the dashed line in FIG. 16, adjusted offset components (the output of the integrating amplifier 107 shown in the solid line) is greatly lowered according to the preparation of the divided offset adjustment lines 165'. A lowest offset level of the integrating amplifier(s) 107 in each integrating TAB 144 regarding one specific signal line 105 may be lowered to a negative saturation level of the integrating amplifier 107.

Even a highest offset level after the offset adjustment over the integrating TABs 144 is significantly lowered so that the integrating amplifier 107 can have a significantly wider dynamic range (Dynamic Range C in FIG. 16) for detecting signals resulting from the X-ray radiation generated from the X-ray generator 12. This Dynamic Range C becomes a dynamic range allowed for the X-ray detector 10 as a whole to detect signals resulting from the X-ray radiation generated from the X-ray generator 12. Even compared to the Dynamic Range B in FIG. 5, the Dynamic Range C is obviously wider. Division of the offset adjustment line makes it possible to secure a dynamic range of the integrating amplifier 107 more flexibly and more sufficiently.

Figure 17:
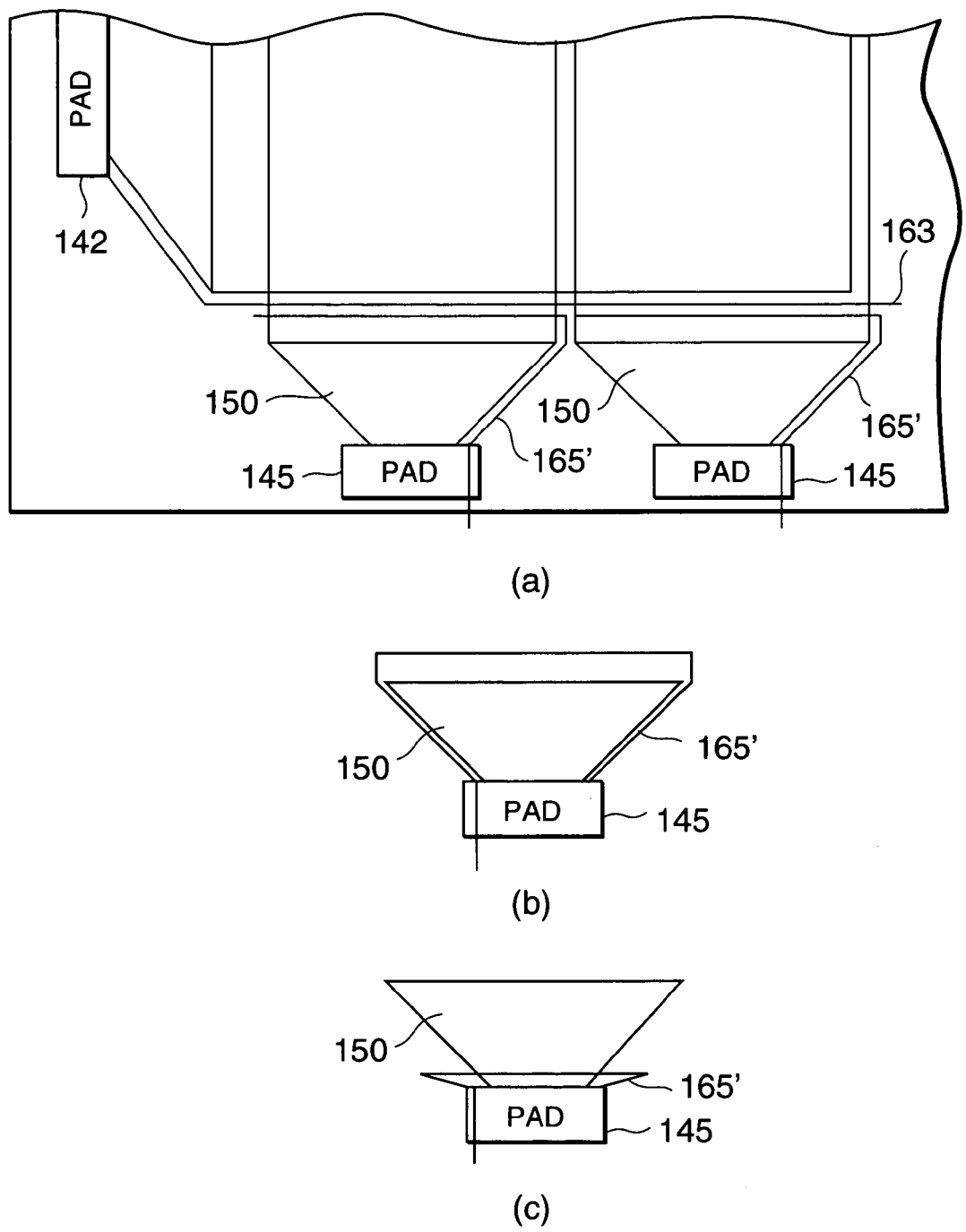
FIG. 17 is an illustration showing further examples of the divided offset adjustment lines according to the fifth embodiment of the present invention.

The divided offset adjustment lines 165' may be provided in various manners as shown in FIG. 17, as well as the example shown in FIG. 15. FIG. 17 is an illustration showing further examples of the divided offset adjustment lines according to the fifth embodiment of the present invention.

In FIG. 15, the divided offset adjustment lines 165' is along the left side of the distribution element 150 and further along the horizontal direction. The divided offset adjustment lines 165', however, may alternatively be provided along the right side of the distribution element 150 and further along the horizontal direction as shown in FIG. 17(a). Further, as shown in FIG. 17(b), each of the divided offset adjustment lines 165' may alternatively be provided to circumscribe each of the distribution element 150. Still further, each of the divided offset adjustment lines 165' may be provided close to the integrating PAD 145 as shown in FIG. 17(c). Accordingly, the parasitic capacitance is generated (or created) at a position close to the integrating PAD 145.

Sixth Embodiment

According to the first to fifth embodiments, the offset adjustment line 165 or the divided offset adjustment lines 165' are provided between the control line 163 and the integrating circuit 112 or the integrating PAD 145. However, the placement of the offset adjustment line 165 or the divided offset adjustment lines 165' are limited to such described position.

Figure 18:
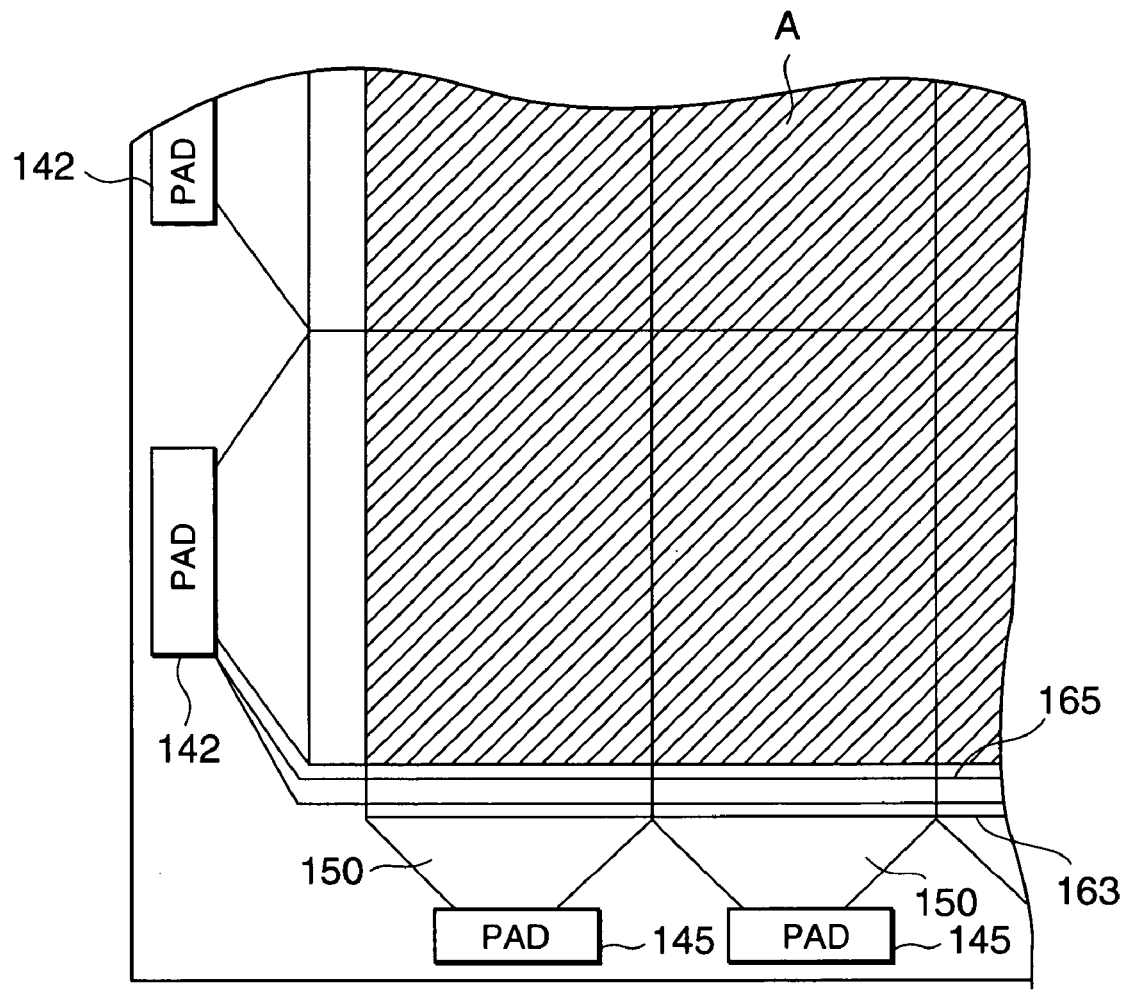
FIG. 18 is an illustration showing an example of an alternative position of an offset adjustment line according to a sixth embodiment of the present invention.

FIG. 18 is an illustration showing an example of an alternative position of the offset adjustment line 165 according to a sixth embodiment of the present invention. As shown in FIG. 18, for example, the offset adjustment line 165 is provided between the detection area A and the control line 163. Similar to the offset adjustment line 165, the divided offset adjustment lines 165' may be provided between the detection area A and the control line 163, too.

As shown in FIGS. 17 and 18, the offset adjustment line 165 (or the divided offset adjustment lines 165') may be provided with or without the third pixels 104 anywhere between the detection area A and the integrating circuit 112 (or the integrating amplifier 107) as long as the offset adjustment line 165 (the divided offset adjustment lines 165'), in other words, the second adjustment area C can create a predetermined charge for the offset adjustment regarding all or desired signal lines 105.

Seventh Embodiment

The third predetermined voltage does not necessarily have to be supplied to the offset adjustment line 165 (the divided offset adjustment lines 165') either through the driver PAD 142 or through the integrating PAD 145.

Figure 19:
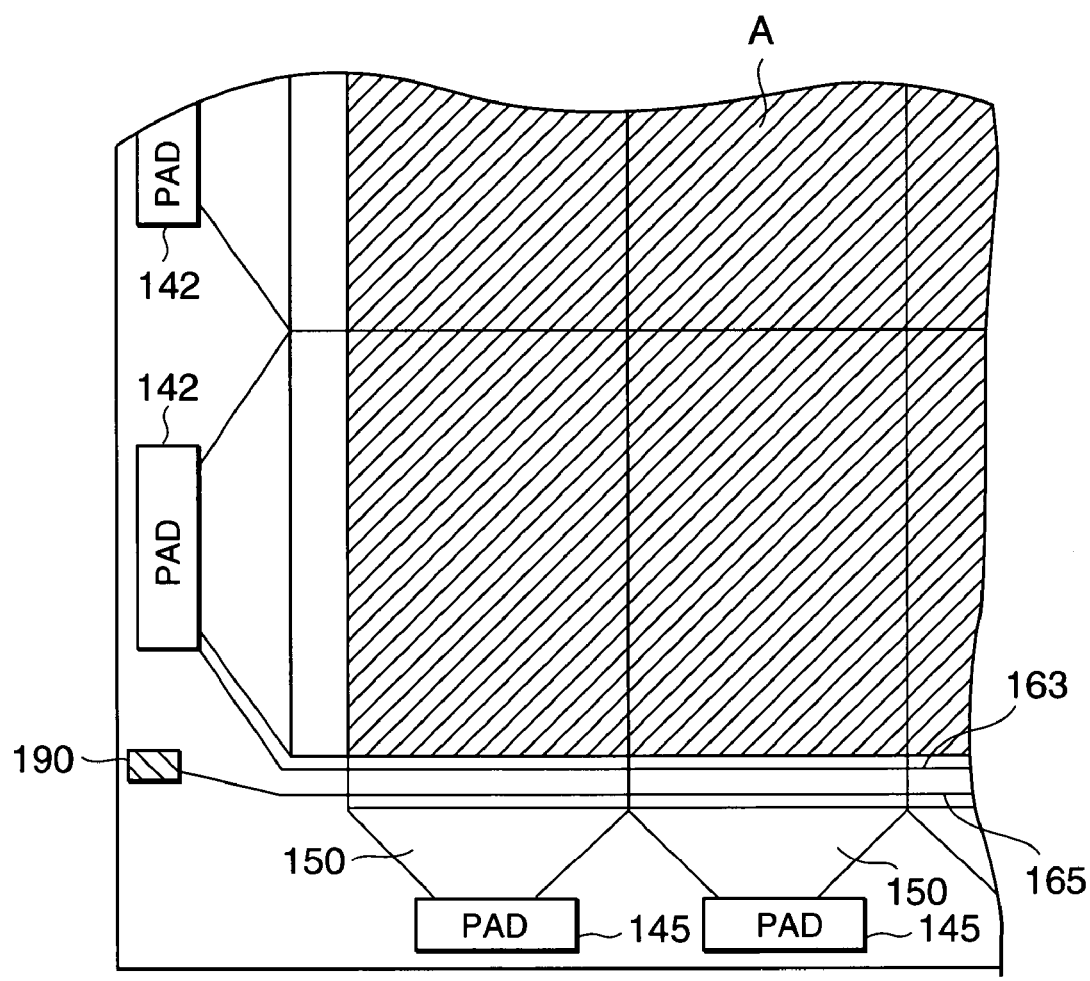
FIG. 19 is an illustration showing an exemplary configuration regarding a supply of a third predetermined voltage according to a seventh embodiment of the present invention.

Next, FIG. 19 is an illustration showing an exemplary configuration regarding the supply of the third predetermined voltage according to a seventh embodiment of the present invention. As shown in FIG. 19, the X-ray detector 10 includes an independent PAD 190 for supplying the third predetermined voltage to the offset adjustment line 165 (the divided offset adjustment line 165'). The independent PAD 190 may be included in the driver TAB 141 or may alternatively be provided in a TAB independent from the driver TAB 141.

Eighth Embodiment

Figure 20:
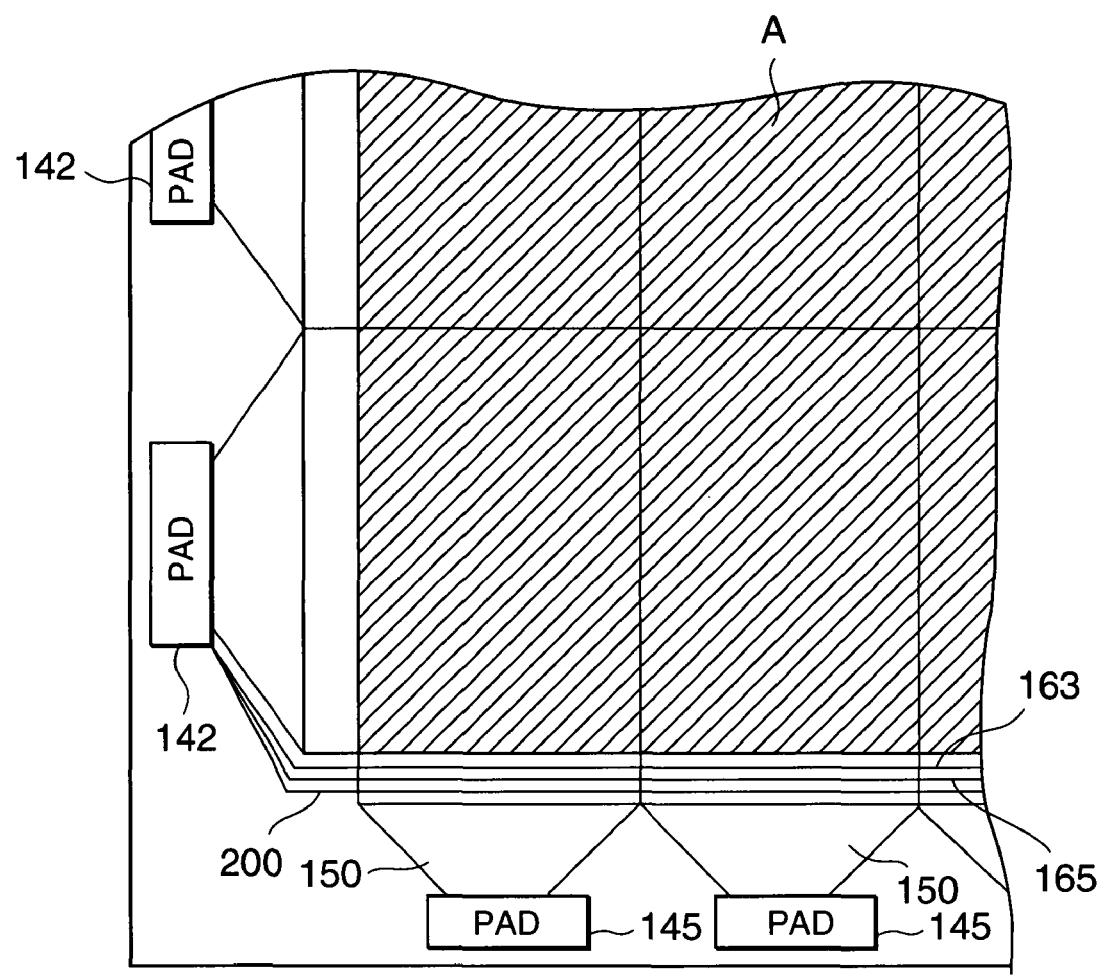
FIG. 20 is an illustration showing an example of further signal line according to an eighth embodiment of the present invention.

FIG. 20 is an illustration showing an example of further signal line according to an eighth embodiment of the present invention.

In the above-described embodiments of the present invention, the control line 163 and the offset adjustment line 165 (the divided offset adjustment lines 165') are provided independently since they are independently supplied the second and the third predetermined voltages, respectively. Similarly, if other signal lines are required for some reason, such as, for example, controlling the offset adjustment line 165 at another timing, such additional signal lines may be provided in the X-ray detector 10. In FIG. 20, a signal line 200 is provided along with the control line 163 and the offset adjustment line 165 between the detection area A and the integrating PAD 145. The signal line 200 can be used for other control purposes. According to necessity, there may be provided X number and Y types of signal lines for further purposes as well as the control line 163 and the offset adjustment line 165.

Figure 21:
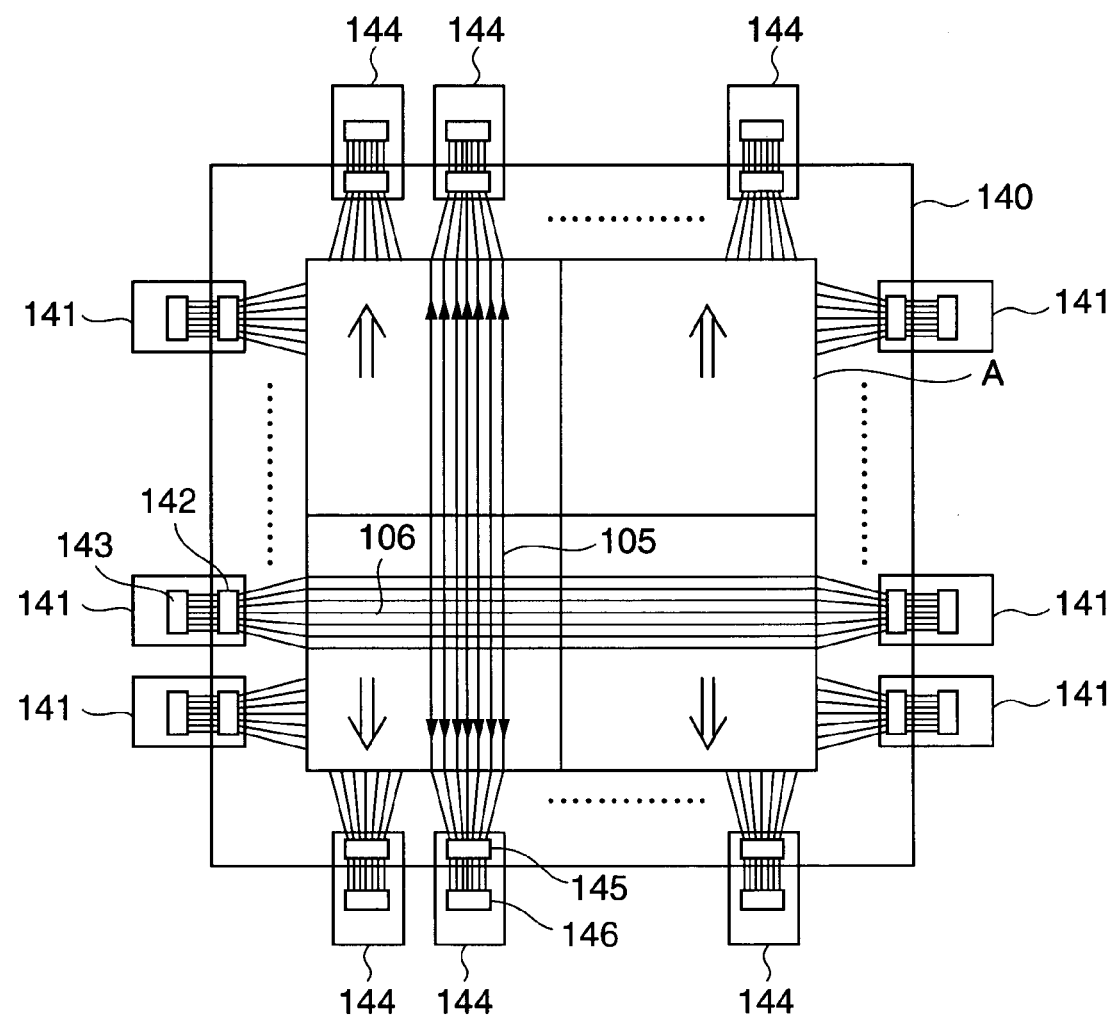
FIG. 21 is an illustration showing another exemplary configuration of the X-ray detector according to embodiments of the present invention.

Next, FIG. 21 is an illustration showing another exemplary configuration of the X-ray detector 10 according to embodiments of the present invention. As shown in FIG. 21, the driver TAB 141 is provided on two opposed sides of the detection area A. Accordingly, the first predetermined voltage is supplied to the vertical select lines 106 from the two sides. Accordingly, a distance from the first gate driver 108 to a farthest first pixel 100 can be shortened. As a result, a fluctuation of the charge injection may be reduced. Further, the timing difference of supplying the first predetermined voltage between to a first pixel 100 closest to the first gate driver 108 and to the farthest first pixel 100 may be reduced so as to result in a better detection result.

Similarly, the second predetermined voltage and/or the third predetermined voltage may also be supplied to the control line 163 and/or the offset adjustment line 165 from the two sides. Accordingly, a distance from the second gate driver 130 and/or the third gate driver 131 to a farthest second pixel 109 and/or a farthest third pixel 165 can shorten.

Still further, the integrating TAB 144 may also be provided on another two opposed sides of the detection area A. This also contributes to a better detection result.

As described above, the offset adjustment according to embodiments of the present invention is implemented based on a predetermined condition prior to a radiography or a fluoroscopy with X-ray radiation to the X-ray detector 10. In addition, the offset adjustment value (e.g., S/H2-S/H0, S/H1-S/H0, S/H2, or S/H1) and the predetermined condition, such as, for example, the third predetermined voltage and the like, are stored in the correction data memory 15. Therefore, when such a radiography or such a fluoroscopy is implemented, if the same condition (the stored predetermined condition) is applied to the radiography or the fluoroscopy, the integrating amplifiers 107 can have a sufficiently wide dynamic range (e.g., Dynamic Range B or C) so as to amplify detection signals resulting from the X-ray radiation in a preferable manner without any saturation. Further, subtracting the stored offset adjustment value from the output of the integrating amplifiers 107 in the radiography or the fluoroscopy, the subtracted result can represent an actual detected value resulting from the radiography or the fluoroscopy.

The offset adjustment according to embodiments of the present invention may be advantageous of securing a sufficiently wide dynamic range even when a capacitance of the amplifying capacitor 110 in the integrating circuit 112 is made small so as to read out small signals in the fluoroscopy, for example. This leads to an improvement of a signal-to-noise (S/N) ratio. Further, it allows for using a conventional manufacturing technology and facility because of the described array design. Therefore, it is easy to manufacture the X-ray detector, for example, without additional processes in the manufacture.

The embodiments of the present invention described above are examples described only for making it easier to understand the present invention, and are not described for the limitation of the present invention. Consequently, each component and element disclosed in the embodiments of the present invention may be redesigned or modified to its equivalent within a scope of the present invention. Furthermore, any possible combination of such components and elements may be included in a scope of the present invention as long as an advantage similar to those obtained according to the above disclosure in the embodiments of the present invention is obtained.

Obviously, numerous modifications and variations of the present invention are possible in light of the above teachings. It is therefore to be understood that within the scope of the appended claims, the invention may be practiced otherwise than as specifically described herein.

The invention claimed is:

1. A radiation detector comprising:
   a detection member including a plurality of pixels and configured to generate a first charge based on radiation detected by the plurality of pixels;
   a first driver configured to supply the detection member with a first predetermined voltage so that the detection member generates the first charge;
   an integration amplifier configured to amplify the first charge generated from the detection member; and
   a first adjustment member provided in between the detection member and the integration amplifier, and configured to adjust an offset component included in the first charge to be amplified by the integration amplifier,
   wherein the offset component is a charge output from the integration amplifier when the detector does not detect a radiation.

2. The detector according to claim 1, wherein the first adjustment member reduces the offset component.

3. The detector according to claim 1, wherein each of the plurality of pixels of the detection member includes a conversion element configured to convert a radiation to the first charge, a first capacitor configured to store the first charge converted by the conversion element, and a first switching element configured to generate the first charge stored in the first capacitor in response to the supply of the first predetermined voltage from the first driver.

4. The detector according to claim 3, wherein the first switching element comprises a thin film transistor.

5. The detector according to claim 1, wherein the first adjustment member is formed on a substrate where the detection member is formed.

6. The detector according to claim 1, wherein the first adjustment member includes a second switching element.

7. The detector according to claim 6, wherein the second switching element comprises a thin film transistor.

8. The detector according to claim 7, wherein a terminal of the thin film transistor is connected to a second capacitor.

9. The detector according to claim 7, wherein a terminal of the thin film transistor is grounded.

10. The detector according to claim 7, wherein a terminal of the thin film transistor is maintained at a predetermined potential.

11. The detector according to claim 7, wherein a terminal of the thin film transistor is open.

12. The detector according to claim 1, wherein the first adjustment member includes a first adjustment line and a second driver configured to supply the first adjustment line with a second predetermined voltage so that the first adjustment member adjusts the offset component.

13. The detector according to claim 12, further comprising
a plurality of selection lines through which the first driver supplies the detection member with the first predetermined voltage; and
a first pad configured to bundle each predetermined number of the plurality of selection lines and a second pad, independent from the first pad, configured to connect the second driver to the first adjustment line.

14. The detector according to claim 1, further comprising a reset element configured to reset the integration amplifier, and a processor configured to sample the first charge amplified by the integration amplifier at a first timing after a release of a first reset by the reset element and at a second timing between the first timing and a second reset by the reset element.

15. The detector according to claim 14, wherein the first adjustment member includes a first adjustment line and a second driver configured to start to supply the first adjustment line with a second predetermined voltage between the first timing and the second timing so that the first adjustment member adjusts the offset component.

16. The detector according to claim 15, wherein the second driver terminates the supply of the second predetermined voltage between the second timing and a next of the first timing.

17. The detector according to claim 16, wherein the first driver supplies the detection member with the first predetermined voltage in a predetermined period between the first timing and the termination by the second driver.

18. The detector according to claim 14, wherein the first driver supplies the detection member with the first predetermined voltage in a predetermined period between the first timing and the second timing.

19. A radiation detector comprising:
a detection member including a plurality of pixels and configured to generate a first charge based on radiation detected by the plurality of pixels;
a first driver configured to supply the detection member with a first predetermined voltage so that the detection member generates the first charge;
an integration amplifier configured to amplify the first charge generated from the detection member; and
a first adjustment member provided in between the detection member and the integration amplifier, having a parasitic capacitance, and configured to adjust an offset component included in the first charge to be amplified by the integration amplifier,
wherein, the first adjustment member includes a first adjustment line, and when the detection member generates the first charge through a signal line, the parasitic capacitance is generated at a crossing point between the signal line and the first adjustment line.

20. The detector according to claim 19, wherein the signal line has a different width at the crossing point.

21. The detector according to claim 19, wherein the first adjustment line has a different width at the crossing point.

22. The detector according to claim 19, wherein the first adjustment line has a wider width than the signal line.

23. The detector according to claim 19, wherein the first adjustment member includes a plurality of first adjustment lines, and the parasitic capacitance is generated at crossing points between the signal line and the plurality of first adjustment lines.

24. The detector according to claim 19, wherein the offset component is a charge output from the integration amplifier when a radiation is not radiated to the detector.

25. A radiation detector comprising:
a detection member including a plurality of pixels and configured to generate a first charge based on radiation detected by the plurality of pixels;
a first driver configured to supply the detection member with a first predetermined voltage so that the detection member generates the first charge;
an integration amplifier configured to amplify the first charge generated from the detection member; and
a first adjustment member provided in between the detection member and the integration amplifier, and configured to adjust an offset component included in the first charge to be amplified by the integration amplifier,
wherein the offset component is a charge output from the integration amplifier when the detector does not detect a radiation, and
the integration amplifier comprises a plurality of amplifying elements, the first adjustment member adjusts the offset component for each of the plurality of amplifying elements independently.

26. A radiation detector comprising:
a detection member including a plurality of pixels and configured to generate a first charge based on radiation detected by the plurality of pixels;
a first driver configured to supply the detection member with a first predetermined voltage so that the detection member generates the first charge;
an integration amplifier configured to amplify the first charge generated from the detection member; and
a first adjustment member provided in between the detection member and the integration amplifier, and configured to adjust an offset component included in the first charge to be amplified by the integration amplifier,
wherein the detection member is configured to generate the first charge through a plurality of signal lines, and the first adjustment member is configured to adjust the offset component for each predetermined number of the plurality of signal lines independently.

27. The detector according to claim 26, further comprising a pad configured to bundle the each predetermined number of the plurality of signal lines.

28. The detector according to claim 27, further comprising a tab configured to include the pad, wherein the integration amplifier is included in the tab and wherein the each predetermined number of the plurality of signal lines are connected to the integration amplifier through the pad.

29. The detector according to claim 27, wherein the first adjustment member includes a first adjustment line distributed along a left side of the each predetermined number of the plurality of signal lines, the first adjustment line extending to intersect the each predetermined number of the plurality of signal lines.

30. The detector according to claim 27, wherein the first adjustment member includes a first adjustment line distributed along a right side of the each predetermined number of the plurality of signal lines, the first adjustment line extending to intersect the each predetermined number of the plurality of signal lines.

31. The detector according to claim 27, wherein the first adjustment member includes a first adjustment line distributed along a left side of the each predetermined number of the plurality of signal lines, extending to intersect the each predetermined number of the plurality of signal lines, and further distributed along a right side of the each predetermined number of the plurality of signal lines.

32. The detector according to claim 27, wherein the first adjustment member includes a first adjustment line intersecting, near the pad, the each predetermined number of the plurality of signal lines.

33. A radiation detector comprising:
  a detection member including a plurality of pixels and configured to generate a first charge based on radiation detected by the plurality of pixels;
  a first driver configured to supply the detection member with a first predetermined voltage so that the detection member generates the first charge;
  an integration amplifier configured to amplify the first charge generated from the detection member;
  a first adjustment member provided in between the detection member and the integration amplifier, and configured to adjust an offset component included in the first charge to be amplified by the integration amplifier; and
  a second adjustment member, provided in between the detection member and the integration amplifier, and configured to reduce a second charge resulting from a first predetermined voltage supplied to the detection member from a first driver, the second charge being included in the first charge to be amplified by the integration amplifier.

34. The detector according to claim 33, wherein the second adjustment member is formed on a substrate where the detection member is formed.

35. The detector according to claim 33, wherein the second adjustment member includes a third switching element.

36. The detector according to claim 35, wherein the third switching element comprises a thin film transistor.

37. The detector according to claim 36, wherein a terminal of the thin film transistor is connected to a third capacitor.

38. The detector according to claim 36, wherein a terminal of the thin film transistor is grounded.

39. The detector according to claim 36, wherein a terminal of the thin film transistor is maintained at a predetermined potential.

40. The detector according to claim 36, wherein a terminal of the thin film transistor is open.

41. The detector according to claim 33, wherein the second adjustment member has a predetermined capacitance.

42. The detector according to claim 41, wherein the predetermined capacitance is a parasitic capacitance.

43. The detector according to claim 42, wherein the second adjustment member includes a second adjustment line, and when the detection member generates the first charge through a signal line, the parasitic capacitance is generated at a crossing point between the signal line and the second adjustment line.

44. The detector according to claim 33, wherein the first adjustment member is provided between the detection member and the second adjustment member.

45. The detector according to claim 33, wherein the first adjustment member is provided between the second adjustment member and the integration amplifier.

46. The detector according to claim 33, wherein the second adjustment member includes a second adjustment line and a third driver configured to supply the second adjustment line with a third predetermined voltage so that the second adjustment member reduces the second charge.

47. The detector according to claim 46, wherein the third driver supplies the second adjustment line with the third predetermined voltage in a substantially same period as the supply of the first predetermined voltage by the first driver.

48. A radiodiagnosis apparatus for obtaining a radiograph, comprising:
  a radiation generator configured to generate a radiation;
  a radiation detector configured to detect the radiation generated by the radiation generator, the radiation detector including,
    a detection member including a plurality of pixels and configured to generate a charge,
    a driver configured to supply the detection member with a predetermined voltage so that the detection member generates the charge,
    an integration amplifier configured to amplify the charge generated from the detection member and output the amplified charge as a detection signal,
    an adjustment member provided in between the detection member and the integration amplifier, and configured to adjust an offset component included in the charge to be amplified by the integration amplifier, wherein the offset component is a charge output from the integration amplifier when the detector does not detect a radiation;
  a memory configured to store a first of the detection signal obtained without the radiation generated by the radiation generator;
  a processor configured to obtain a difference signal between the first detection signal stored in the memory and a second of the detection signal obtained when the radiation generator generates the radiation; and
  a display configured to display an image based on the detection signal and the difference signal.

* * * * *